(12) United States Patent
Wei

(10) Patent No.: US 12,559,846 B2
(45) Date of Patent: Feb. 24, 2026

(54) COMPOSITIONS AND METHODS FOR ENHANCING ELECTROCATALYTIC EFFICIENCIES

(71) Applicant: The University of North Carolina at Greensboro, Greensboro, NC (US)

(72) Inventor: Jianjun Wei, Oak Ridge, NC (US)

(73) Assignee: The University of North Carolina at Greensboro, Greensboro, NC (US)

( * ) Notice: Subject to any disclaimer, the term of this patent is extended or adjusted under 35 U.S.C. 154(b) by 861 days.

(21) Appl. No.: 17/269,695

(22) PCT Filed: Aug. 22, 2019

(86) PCT No.: PCT/US2019/047675
§ 371 (c)(1),
(2) Date: Feb. 19, 2021

(87) PCT Pub. No.: WO2020/041575
PCT Pub. Date: Feb. 27, 2020

(65) Prior Publication Data
US 2021/0198792 A1 Jul. 1, 2021

Related U.S. Application Data

(60) Provisional application No. 62/721,278, filed on Aug. 22, 2018.

(51) Int. Cl.
C25B 1/04 (2021.01)
C25B 11/077 (2021.01)
(Continued)

(52) U.S. Cl.
CPC .............. C25B 1/04 (2013.01); C25B 11/077 (2021.01); C25B 15/00 (2013.01); C25D 9/08 (2013.01);
(Continued)

(58) Field of Classification Search
CPC .......... C25B 15/00; C25B 15/02; C25B 1/02; C25B 1/04; C25B 1/042; C25B 1/044; C25B 11/077; H01M 4/9016
See application file for complete search history.

(56) References Cited

U.S. PATENT DOCUMENTS 5,942,349 A   8/1999  Badwal et al.
6,207,313 B1 *  3/2001  Leddy ................... H01F 10/007
                                      204/290.01
(Continued)

FOREIGN PATENT DOCUMENTS

KR      20060092741 A  *  8/2006  ........... B23H 11/003
WO  WO-2016096806 A1 *  6/2016  ............. C25B 11/04
WO      20170182923 A1    10/2017

OTHER PUBLICATIONS

Pullins et al. "Microscale Confinement of Paramagnetic Molecules in Magnetic Field Gradients Surrounding Ferromagnetic Microelectrodes" J. Phys. Chem. B 2001, 105, 8989-8994 (Year: 2001).*

(Continued)

*Primary Examiner* — Luan V Van
*Assistant Examiner* — Alexander R. Parent
(74) *Attorney, Agent, or Firm* — J. Clinton Wimbish; Maynard Nexsen PC

(57) ABSTRACT

A method of enhancing efficiency of an oxygen evolution reaction (OER), oxygen reduction reaction (ORR), or hydrogen evolution reaction (HER) comprises increasing total number electron pathway and/or reaction kinetics of the OER, ORR, or HER by coating one or more surfaces of an electrode participating in the OER, ORR, or HER with one or more metal oxides.

17 Claims, 23 Drawing Sheets

(51) Int. Cl.
| | |
|---|---|
| *C25B 15/00* | (2006.01) |
| *C25D 9/08* | (2006.01) |
| *H01M 4/90* | (2006.01) |
| *C25B 1/30* | (2006.01) |

(52) U.S. Cl.
CPC ....... *H01M 4/9016* (2013.01); *H01M 4/9083* (2013.01); *C25B 1/30* (2013.01); *Y02E 60/36* (2013.01); *Y02E 60/50* (2013.01)

(56) References Cited

U.S. PATENT DOCUMENTS

| | | | |
|---|---|---|---|
| 9,680,193 | B2 | 6/2017 | Amendola et al. |
| 2013/0306489 | A1 | 11/2013 | Calderara et al. |
| 2017/0098843 | A1 | 4/2017 | Manthiram et al. |
| 2018/0127887 | A1 | 5/2018 | Calderara et al. |

OTHER PUBLICATIONS

Okada et al. "The effect of magnetic field on the oxygen reduction reaction and its application in polymer electrolyte fuel cells" Electrochimica Acta 48 (2003) 531-539 (Year: 2003).*

Iida et al. "Water Electrolysis under a Magnetic Field" Journal of the Electrochemical Society, 154 (8) E112-E115 (2007) (Year: 2007).*

Furrer et al. (2009). ASM Handbook, vol. 22A—Fundamentals of Modeling for Metals Processing—46. Periodic Table of Elements (pp. 585) ASM International (Year: 2009).*

Tulloch et al. "Activity of perovskite La1—xSrxMnO3 catalysts towards oxygen reduction in alkaline electrolytes" Journal of Power Sources 188 (2009) 359-366 (Year: 2009).*

Matsushima et al. "Measurement of dissolved hydrogen supersaturation during water electrolysis in a magnetic field" Electrochimica Acta 54 (2009) 5858-5862 (Year: 2009).*

Monzon et al. "Electrosynthesis of Iron, Cobalt, and Zinc Microcrystals and Magnetic Enhancement of the Oxygen Reduction Reaction" Chem. Mater. 2012, 24, 3878-3885. (Year: 2012).*

Lin et al. "The effect of magnetic force on hydrogen production efficiency in water electrolysis" International Journal of Hydrogen Energy vol. 37, Issue 2, Jan. 2012, pp. 1311-1320 (Year: 2012).*

Zielinski "Positive and Negative Aspects of Electrode Reactions of Hydrogen Evolution and the Influence of a Constant Magnetic Field" J Adv Chem Eng 2014, 4:2 (Year: 2014).*

Bhattacharya et al. (2015). Engineering Physics—14.4.2 Paramagnetism. (pp. 555). Oxford University Press. (Year: 2015).*

Wang et al. "The effect of the internal magnetism of ferromagnetic catalysts on their catalytic activity toward oxygen reduction reaction under an external magnetic field" Ionics (2016) 22:2195-2202 (Year: 2016).*

Gracia "Spin dependent interactions catalyse the oxygen electrochemistry" Phys. Chem. Chem. Phys., 2017, 19, 20451 (Year: 2017).*

Mtangi et al. "Control of Electrons' Spin Eliminates Hydrogen Peroxide Formation During Water Splitting" J. Am. Chem. Soc. 2017, 139, 2794-2798 (Year: 2017).*

Vanysek "The Electrochemical Series" in CRC Handbook of Chemistry and Physics, 104th Edition (Internet Version 2023), John R. Rumble, ed., CRC Press/Taylor & Francis, Boca Raton, FL (Year: 2023).*

Liang et al. ("Oxygen Reduction Electrocatalyst Based on Strongly Coupled Cobalt Oxide Nanocrystals and Carbon Nanotubes" J. Am. Chem. Soc. 2012, 134, 15849-15857) (Year: 2012).*

Meng et al. ("Structure-Property Relationship of Bifunctional MnO2 Nanostructures: Highly Efficient, Ultra-Stable Electrochemical Water Oxidation and Oxygen Reduction Reaction Catalysts Identified in Alkaline Media" J. Am. Chem. Soc. 2014, 136, 11452-11464 (Year: 2014).*

Shi et al. ("Synthesis of Layered MnO2 Nanosheets for Enhanced Oxygen Reduction Reaction Catalytic Activity" Electrochimica Acta 132 (2014) 239-243) (Year: 2014).*

Fujita et al. ("Electrocatalytic Activity and Durability of LixNi2—xO2/Ni Electrode Prepared by Oxidation with LiOH Melt for Alkaline Water Electrolysis" Electrocatalysis (2017) 8:422-429 (Year: 2017).*

Dong et al. ("Ni-doped TiO2 nanotubes photoanode for enhanced photoelectrochemical water splitting" Applied Surface Science 443 (2018) 321-328 (Year: 2018).*

Trunov "Analysis of oxygen reduction reaction pathways on Co3O4, NiCo2O4, Co3O4—Li2O, NiO, NIO—Li2O, Pt, and Au electrodes in alkaline medium" Electrochimica Acta 105 (2013) 506-513 (Year: 2013).*

Yuan et al. "Nanocomposite of N-Doped TiO2 Nanorods and Graphene as an Effective Electrocatalyst for the Oxygen Reduction Reaction" ACS Appl. Mater. Interfaces 2014, 6, 21978-21985 (Year: 2014).*

Liu et al. "Carbon nanofibers as nanoreactors in the construction of PtCo alloy carbon core-shell structures for highly efficient and stable water splitting" Materials and Design 109 (2016) 162-170 (Year: 2016).*

Xiong et al. "Fe/Ni—N-CNFs electrochemical catalyst for oxygen reduction reaction/oxygen evolution reaction in alkaline media" Applied Surface Science 401 (2017) 89-99 (Year: 2017).*

Tang et al. "Anchoring CoFe2O4 Nanoparticles on N-Doped Carbon Nanofibers for High-Performance Oxygen Evolution Reaction." Adv. Sci. 2017, 4, 1700226 (Year: 2017).*

Pei et al. "Co/CoO Nanoparticles/Ag Nanowires/Nitrogen Codoped Electrospun Carbon Nanofibers as Efficient Electrocatalysts for Oxygen Reduction" Int. J. Electrochem. Sci., 11 (2016) 8994-9006 (Year: 2016).*

Lee et al. "The electrochemical enhancement due to the aligned structural effect of carbon nanofibers in a supercapacitor electrode" Synthetic Metals 226 (2017) 195-206 (Year: 2017).*

International Search Report and Written Opinion corresponding to PCT/US2019/047675, mailed Oct. 29, 2019, 8 pages.

* cited by examiner

COMPOSITIONS AND METHODS FOR ENHANCING ELECTROCATALYTIC EFFICIENCIES

RELATED APPLICATION DATA

This application is a U.S. National Phase of PCT/US2019/047675, filed Aug. 22, 2019, which claims priority pursuant to 35 U.S.C. § 119(e) to U.S. Provisional Patent Application Ser. No. 62/721,278 filed Aug. 22, 2018, each of which are incorporated herein by reference in their entireties.

FIELD

The invention generally relates to compositions and methods for conducting electrocatalytic reactions and, in particular, to compositions and methods for enhancing electrocatalytic efficiencies.

BACKGROUND

Given the promise shown by electrochemical cells as devices for generating clean and sustainable energy, the electrocatalytic oxygen reduction reaction (ORR) or hydrogen evolution reaction (HER) has been widely studied using steady-state polarization, rotating disk electrodes (RDE), rotating ring-disk electrodes (RRDE), and cyclic voltammetry. Electrocatalysts including carbon-based materials, such as glassy carbon (GC), graphite, activated carbon, and carbon nanotubes; Pt catalysts (Pt nanoparticles and Pt alloys); and transition metal-based catalyst (cobalt and iron) have been explored for conducting the ORR. ORR or HER performance is complex, varying with synthesis conditions, nitrogen doping, metal type, and pyrolysis temperature. For ORR, to ensure that the fuel cell generates the maximum power output, a 4-electron pathway (from oxygen to water) is necessary, because the 2-electron pathway (from oxygen to hydrogen peroxide) involved in the cathodic process dramatically compromises the energy yield of the fuel cell. Moreover, cell membranes and other supporting materials are impaired by the presence of excess hydrogen peroxide, owing to peroxide radicals generated from a disproportionation reaction.

Consequently, improved methods for increasing and maintaining the efficiency of the 4-electron pathway are needed.

SUMMARY

In one aspect, methods of enhancing efficiency of an oxygen evolution reaction (OER), oxygen reduction reaction (ORR), or hydrogen evolution reaction (HER) are described herein which, in some embodiments, can provide one or more advantages compared to other methods. In some embodiments, a method of enhancing efficiency of an oxygen evolution reaction (OER), oxygen reduction reaction (ORR) and/or hydrogen evolution reaction (HER) comprises increasing total number electron pathway and reaction kinetics of the OER, ORR or HER by coating one or more surfaces of an electrode participating in the OER, ORR or HER with one or more metal oxides.

Metal(s) of the oxide coating can comprise one or more transition metals, non-transition metals or various combinations thereof. In some embodiments, metal of the oxide or transition metal of the oxide is paramagnetic. Suitable transition metals of the oxide, for example, can be selected from Groups IIIB-VIIIB of the Periodic Table. In some instances, the metal oxide comprises manganese oxide, iron oxide, and/or cobalt oxide. The metal oxide can also comprise one or more dopants. The dopants can include one or more alkali metals, alkaline earth metals or mixtures thereof.

In some embodiments, the coating comprising metal oxide has structure to confine reaction products created at the electrode, where one or more of the reaction products undergo oxidation or reduction by the electrode.

The metal oxide can be deposited on any part and/or composition of the electrode not inconsistent with the objectives of the present invention. In some embodiments, for example, the metal oxide is deposited one or more carbon nanostructures of the electrode. These carbon nanostructures can comprise nanofibers, nanotubes, nanospheres, nanosheets, graphene, nanodots or combinations thereof. In some instances, the carbon nanostructures are aligned carbon nanofibers.

As described further herein, the metal oxide coating can increase the total number electron pathway and/or reaction kinetics of the OER, ORR and/or HER. In some embodiments, for example, the total number electron pathway of the ORR can be at least 3.4. In other embodiments, the total number electron pathway can range from 3.6 to 4, 3.85 to 4 or 3.9 to 4.

Notably, methods described herein can further comprise applying a magnetic field to the metal oxide coated electrode, where the applied magnetic field has a magnitude of 0.1 to 1000 mT.

In another aspect, a method of enhancing efficiency of an oxygen evolution reaction (OER), oxygen reduction reaction (ORR), and/or hydrogen evolution reaction (HER) comprises increasing total number electron pathway and/or reaction kinetics by conducting the OER, ORR and/or HER in an applied magnetic field. In some embodiments, the applied magnetic field has a magnitude of 0.1 to 1000 mT. The total number electron pathway of the ORR conducted under the applied magnetic field can be at least 3.4 or at least 3.6. In some embodiments, the total electron pathway for the ORR can range from 3.85 to 4 or 3.9 to 4.

One or more electrodes participating in the OER, ORR or HER can have any construction and/or properties described herein. An electrode, for example, can comprise a metal oxide coating as described above. Additionally, the metal oxide coating can have structure to confine reaction products created at the electrode, were the one or more of the reaction products undergo oxidation or reduction by the electrode.

In another aspect, an energy generation device comprises an electrochemical cell comprising one or more electrodes for performing an oxygen evolution reaction (OER), oxygen reduction reaction (ORR), or hydrogen evolution reaction (HER); and a magnetic field source for application of a magnetic field to the one or more electrodes during the OER, ORR or HER.

These and other embodiments are further described in the detailed description, which follows.

BRIEF DESCRIPTION OF THE DRAWINGS

FIG. 14a is a SEM associated with EDX mapping analysis, FIG. 14b is thermogravimetric analysis (TGA), FIG. 14c is Raman spectrum analysis, FIG. 14d is Fourier transform infrared (FTIR) spectrum analysis, FIG. 14e is x-ray photoelectron spectroscopy (XPS) spectrum analysis, and FIG. 14f is x-ray diffraction (XRD) analysis;

DETAILED DESCRIPTION

Figure 1:
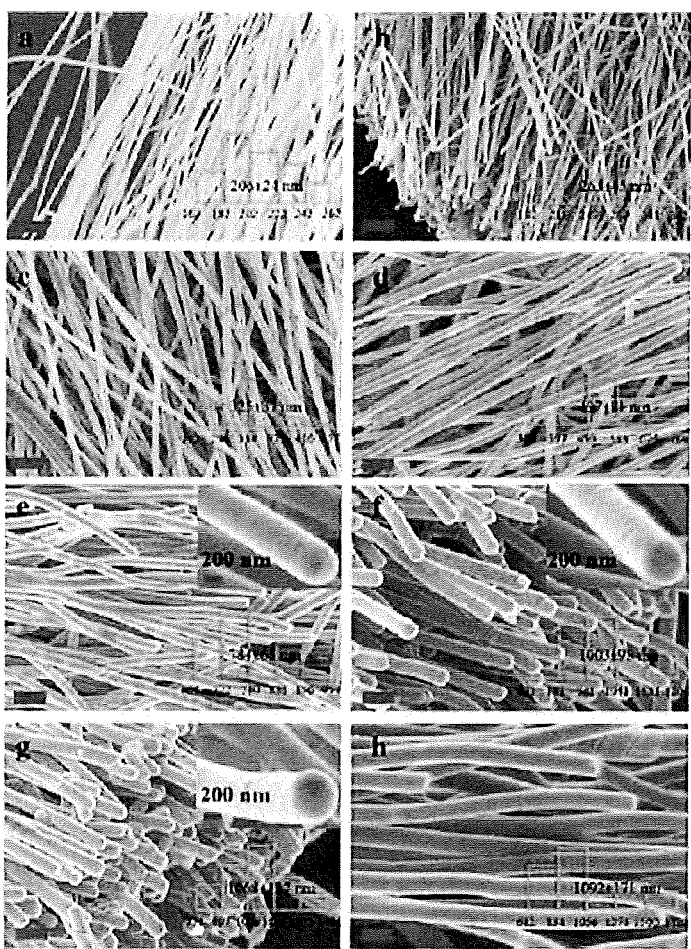
FIGS. 1a-1h are scanning electron microscopy ("SEM") images of well-aligned ECNFs (FIG. 1a) and $Co_3O_4$/ECNFs for electrodeposition times of 1-8 h (FIGS. 1b-1h, respectively) with the histograms (y axis is the frequency) of size distribution analysis.

Embodiments described herein can be understood more readily by reference to the following detailed description and examples. Elements, apparatus and methods described herein, however, are not limited to the specific embodiments presented in the detailed description and examples. It should be recognized that these embodiments are merely illustrative of the principles of the present invention. Numerous modifications and adaptations will be readily apparent to those of skill in the art without departing from the spirit and scope of the invention.

In addition, all ranges disclosed herein are to be understood to encompass any and all subranges subsumed therein. For example, a stated range of "1.0 to 10.0" should be considered to include any and all subranges beginning with a minimum value of 1.0 or more and ending with a maximum value of 10.0 or less, e.g., 1.0 to 5.3, or 4.7 to 10.0, or 3.6 to 7.9. Similarly, a stated range of "1 to 10" should be considered to include any and all subranges beginning with a minimum value of 1 or more and ending with a maximum value of 10 or less, e.g., 1 to 5, or 4 to 10, or 3 to 7, or 5 to 8.

All ranges disclosed herein are also to be considered to include the end points of the range, unless expressly stated otherwise. For example, a range of "between 5 and 10" or "from 5 to 10" or "5-10" should generally be considered to include the end points 5 and 10.

Further, when the phrase "up to" is used in connection with an amount or quantity, it is to be understood that the amount is at least a detectable amount or quantity. For example, a material present in an amount "up to" a specified amount can be present from a detectable amount and up to and including the specified amount.

In one aspect, a method of enhancing efficiency of an oxygen evolution reaction (OER), oxygen reduction reaction (ORR) and/or hydrogen evolution reaction (HER) comprises increasing total number electron pathway of the OER, ORR and/or HER by coating one or more surfaces of an electrode participating in the OER, ORR, or HER with one or more metal oxides.

In another aspect, a method of enhancing efficiency and/or reaction kinetics of an OER, ORR, or HER comprises increasing a total number electron pathway of the OER by conducting the OER, ORR, or HER in an applied magnetic field. In some instances, the applied magnetic field enhances the electrocatalytic efficiency of a transition metal oxide.

In some embodiments, methods described herein can be used for catalyzing OER, ORR, and/or HER in fuel cell, metal-air batteries, and electrochemical cell for water splitting. For example, the methods can enhance an electron transfer rate (kinetics) of the 4-electron pathway in ORR using a paramagnetic transition metal oxide electrocatalyst.

In some embodiments, methods described herein comprise depositing one or more transition metal oxides on an electrode scaffold; applying a magnetic field to the deposited transition metal oxide, and conducting an electrocatalytic reaction with the deposited transition metal oxide in the presence of the magnetic field. Non-limiting examples of metal oxides comprise $MnO_2$, $Co_3O_4$, $Fe_2O_3$, $Fe_3O_4$, $TiO_2$, $NiO_x$, and various combinations thereof. The efficiency of the electrocatalytic reaction can be enhanced by the presence of the magnetic field by improving electron or charge transportation when metal oxides or composites are used for electrocatalysis. In some instances, the electrocatalytic reaction efficiency enhancement occurs under milli-tesla (mT) to tesla strength of magnetic field.

The electrode scaffold can comprise a carbon material, a nanostructured carbon material (i.e. carbon nanostructures), a metal substrate, or other types of electrode scaffolding materials. The carbon material can comprise graphite or other similar carbon-based materials. The nanostructured carbon material can comprise carbon nanotubes, carbon nanofibers, graphene, nanospheres, nanodots, graphene nanofoam (GF), or a reduced graphene oxide (rGO) scaffold. Any other type of nanostructured carbon material not inconsistent with the instant disclosure can be fabricated and used as a scaffold for transition metal oxides. In some embodiments, the electrode scaffold comprise nitrogen-doped electrospun carbon nanofibers (ECNFs). These ECNFs can be produced by carbonizing electrospun polyacrylonitrile (PAN). These nitrogen-doped ECNFs also in some embodiments serve as an electrocatalyst for the ORR in some instances. Aligned ECNF structures can be used as scaffolds to uniformly support metal oxide nanostructures, because their alignment enhances the deposition rate by shortening the distance for electron transport.

In an embodiment, the transition metal oxide is selected from Groups IIIB-VIIIB of the Periodic Table. In some instances, the transition metal oxide is $Co_3O_4$. $Co_3O_4$, which incorporates mixed-valence $Co^{2+}$ and $Co^{3+}$. $Co_3O_4$ has magnetically susceptibility, owing to its spin/spin-orbit coupling-induced magnetic moment, and, as described herein, an external magnetic field affects the electrochemical performance of $Co_3O_4$ as an electrocatalyst. In other instances, the transition metal oxide is $MnO_2$, $Fe_2O_3$, $Fe_3O_4$, $TiO_2$, $NiO_x$, or various combinations thereof, which also have magnetic susceptibility owing to their respects spin/spin-orbit coupling-induced magnetic moments, through which an external magnetic field affects their electrochemical performances as electrocatalysts. Accordingly, while the remaining descriptions herein describe various embodiments using $MnO_2$, $Fe_2O_3$ and/or $Co_3O_4$ as examples, it is to be understood that such embodiments equally apply to, and include, embodiments where the transition metal oxide is $Fe_3O_4$, $TiO_2$, $NiO_x$, or other similar transition metal oxides in Groups IIIB-VIIIB.

In an embodiment, the transition metal oxide comprises $MnO_2$, $Fe_2O_3$ and/or $Co_3O_4$, and the electrode scaffolding material comprises ECNFs. Thus, in some instances, the method comprises depositing $MnO_2$, $Fe_2O_3$, and/or $Co_3O_4$ on a surface of the ECNFs. In some embodiments, more than one metal oxide is deposited on a surface of the ECNFs. The $MnO_2$ can be electrodeposited at the surface of the ECNFs to form $MnO_2$/ECNFs. Likewise, $Co_3O_4$ can be electrodeposited at the surface of the ECNFs to form $Co_3O_4$/ECNFs. In some embodiments, $MnO_2$ and $Fe_2O_3$ are co-deposited at the surface of ECNFs to form $MnO_2$—$Fe_2O_3$/ECNFs. When two or more metal oxides are deposited, each metal oxide can be uniformly dispersed in the coating. Alternatively, metal oxides of the coating may be heterogeneously distributed in the coating.

As described in more detail below, an electron transfer reaction of $MnO_2$ and catalytic ORR reactions have been carried out using uniform electrodepositions of $\alpha$-$MnO_2$ on ECNFs. In some embodiments, the $MnO_2$/ECNFs composite formed by the method described herein, demonstrates a 3.84 electron pathway. As a reference, the theoretical number of electron pathway is 4 for oxygen reduction to water, indicating a large cycle number and excellent catalytic activity obtained by uniform electrodeposition of $\alpha$-$MnO_2$ on ECNFs. In other embodiments, the $MnO_2$/ECNFs composite has an electron pathway of at least 3.7, at least 3.8, at least 3.9, or more than 3.9.

Additionally described below, an electron transfer reaction of $Co_3O_4$ and catalytic ORR reactions have been carried out in the presence and absence of a magnetic field. In some embodiments, a rate of charge transportation for the number of electron pathways and/or reaction kinetics of ORR (representing the efficiency or ORR complete) increases monotonically in the presence of an applied magnetic field having a strength in a range of 0-1.32 mT. In some instances the rate of charge transportation increases monotonically with a magnetic field strength of 0-1.40 mT, 0-1.50 mT, 0-1.60 mT, 0-1.7 mT, 0-1.8 mT, 0-1.9 mT, or 0-2.0 mT. In some embodiments, the $Co_3O_4$/ECNFs composite formed by the method described herein, demonstrates a 3.92 electron pathway in the presence of a 1.32 mT magnetic field, in contrast to a 3.48 electron pathway in the absence of a magnetic field. In other embodiments, the $Co_3O_4$/ECNFs composite has an electron pathway of at least 3.5, at least 3.6, at least 3.7, at least 3.8, or at least 3.95 in the presence of a 1.32 mT magnetic field.

In further embodiments, OER reactions have been carried out using depositions of $Fe_2O_3$ on ECNFs and $Fe_2O_3$—$MnO_2$ composites on ECNFs. These OER reactions were carried out in the presence and absence of magnetic fields of varying strengths.

I. Fabrication of ECNFs

In one aspect, a fabrication method for well-aligned ECNFs is described. In some embodiments, the method comprises fabricating a plurality of interconnected carbon nanofibers via electrospinning. In some embodiments, electrospinning includes spinning a polyacrylonitrile (PAN) on a collector to form a fiber fabric and then pressing and carbonizing the fabric. Other electrospinning techniques can also be used and/or provided.

The ECNFs have reasonably electrical conductive cores (e.g., having a conductivity: 1~10 S/cm) that support and utilize electro-active $MnO_2$ or $Co_3O_4$ coatings. Moreover, ECNFs provide an excellent mechanical scaffold with porosity and interconnectivity for superior hybrid structure.

ECNFs are but one embodiment of the carbon nanostructures that can be used to form electrodes for energy storage devices described herein. However, electrospinning is not required. Other carbon nanostructures can be fabricated according to different fabrication techniques and used as electrode scaffolds for transition metal oxides. Such nanostructures can include carbon nanotubes, carbon nanofibers, graphene, nanospheres, nanodots, graphene nanofoam (GF), or a reduced graphene oxide (rGO) scaffold. Any other type of carbon nanostructure not inconsistent with the instant disclosure can be fabricated and used as a scaffold for metal oxides or transition metal oxides, such as $MnO_2$ or $Co_3O_4$.

Figure 8:
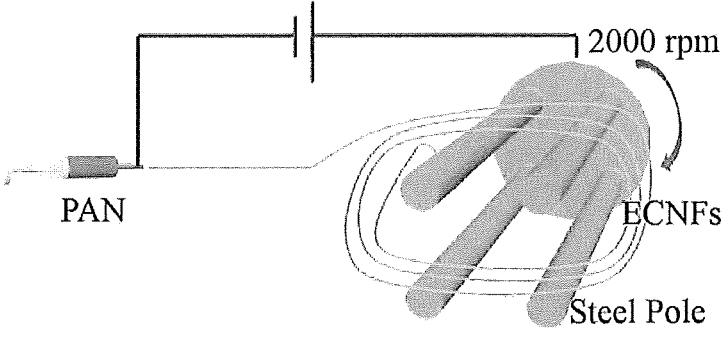
FIG. 8 is a schematic representation of an aligned electrospinning technique and device.
Figure 13:
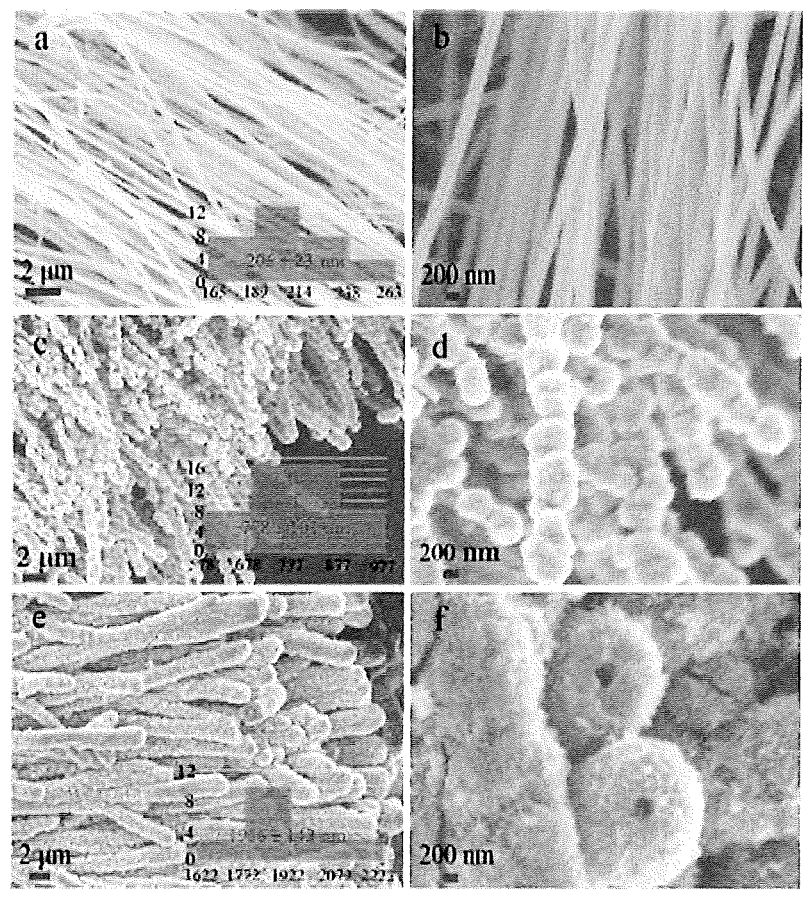
FIGS. 13a-13f are scanning electron microscopy ("SEM") images of well-aligned ECNFs (FIGS. 13a and 13b) and $MnO_2$/ECNFs for electrodeposition times of 2 h and 4 h (FIGS. 13c/13d and 13e/13f, respectively) with the histograms (y axis is the frequency) of size distribution analysis.

In some instances, fabrication of well-aligned ECNFs comprises a facile electrospinning method with a self-designed sample collector, as shown for example in FIG. 8. Different from a normal cylinder design, four steel poles were welded onto a plate to collect the ECNFs without any substrate. After carbonization, the as-prepared pure ECNFs exhibit a well aligned structure (FIGS. 1a and 13a). A nitric acid pretreatment, which introduces hydroxy and carboxyl groups, can be used to make the ECNFs surface more hydrophilic and to introduce reaction sites for the nucleation of $MnO_2$ or $Co_3O_4$ crystallites.

II. $Co_3O_4$ Growth Characterization and Mechanism

Fabrication methods for $Co_3O_4$ electrodeposition onto the well-aligned ECNFs is described herein, where $Co_3O_4$ electrodeposition onto the ECNFs forms a uniform, dense film of $Co_3O_4$ having a self-limiting thickness.

In this embodiment, a uniform layer of the transition metal oxide, $Co_3O_4$, can be electrodeposited on each of the plurality of ECNFs. The transition metal oxide can include $Co_3O_4$ that is electrodeposited on each of the plurality of ECNFs, although any other metal oxide or transition metal oxide not inconsistent with the goals of this disclosure can also be electrodeposited. In some embodiments, low current electrodeposition techniques are used to grow a fine and firm layer of the metal oxide (e.g., $Co_3O_4$). The aforementioned fabrication processes (i.e., electrospinning and electrodeposition) are facial and scalable.

In some instances, a constant low current (50 mA) can applied for the electrodeposition by an electrochemical workstation for various times ranging from 1 h to 8 h under an $N_2$ atmosphere with an aqueous precursor solution containing 20 mM $Co_3O_4$ and 100 mM $Na_2SO_4$. The composites' structures and morphologies were characterized by scanning electron microscopy (SEM; FIGS. 1b-1h). When the electrodeposition starts, thin films form on the functionalized sites distributed on the fibers (FIGS. 1b and 1c). As electrodeposition continues, the films begin to grow denser/thicker and the fibers are fully covered (FIGS. 1d and 1e). After electrodeposition for 5 h, ECNFs with a nanofiber diameter of about 206 nm are decorated by a $Co_3O_4$ film with a thickness of about 797 nm, making a total diameter of about 1003 nm (FIG. 1f). $Co_3O_4$ electrodeposition beyond a 5 h time does not show an obvious thickness increase with the applied constant current (FIGS. 1g and 1h), a feature of self-cessation that likely arises from the increased resistance of the $Co_3O_4$ layers and low current for electrodeposition.

Figure 2:
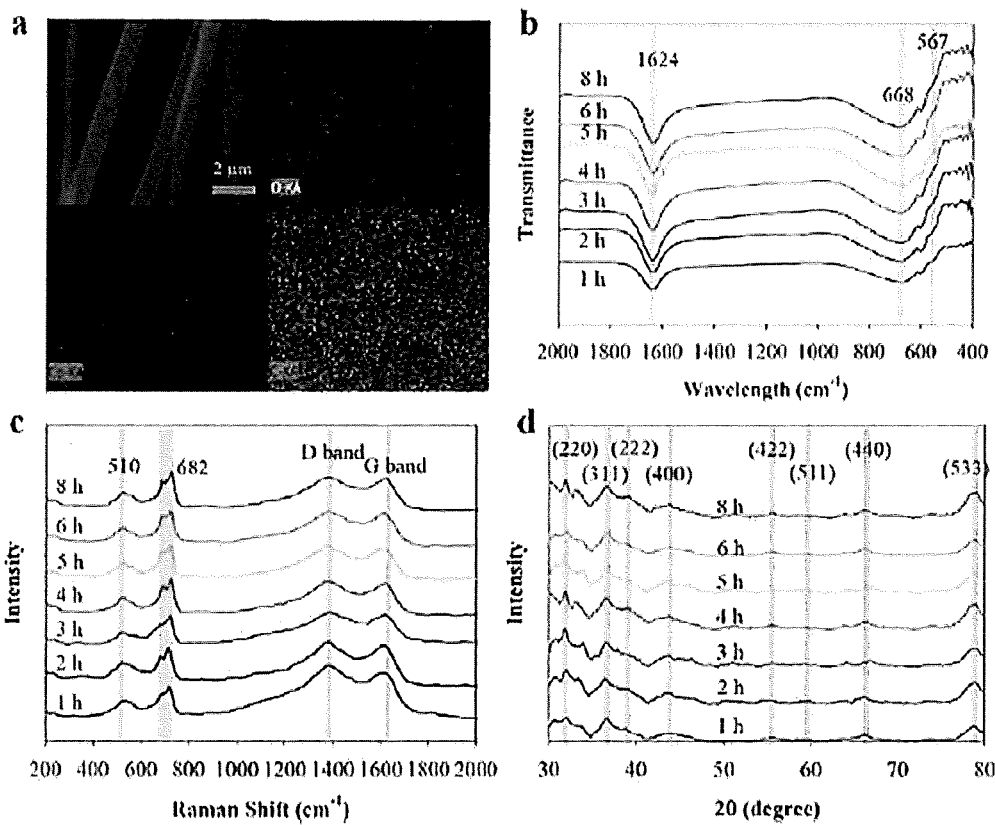
FIG. 2a is a SEM image associated with energy-dispersive x-ray (EDX) mapping analysis of the $Co_3O_4$/ECNFs under electrodeposition of 5 h.
FIG. 2b is an FTIR spectrum of $Co_3O_4$/ECNFs under electrodeposition of 1 h-8 h.
FIG. 2c is a Raman spectrum of $Co_3O_4$/ECNFs under electrodeposition of 1 h-8 h.
FIG. 2d is XRD analysis of the $Co_3O_4$/ECNFs under electrodeposition times of 1 h-8 h.

The chemical composition of the composites under different electrodeposition times from 1 h to 8 h was analyzed by energy-dispersive X-ray (EDX) spectroscopy, Raman spectroscopy, and Fourier transform infrared spectroscopy (FTIR). The EDX spectra (FIG. 2a) show that the surface composition of the electrochemically deposited electrodes is composed of the elements C, O, and Co. The peaks observed at 567 and 668 $cm^{-1}$ in the FTIR spectrum correspond to the stretching vibrations of metal oxide for tetrahedrally coordinated $Co^{2+}$ and octahedrally coordinated $Co^{3+}$ (FIG. 2b), which is further verified by the Raman shifts of 510 and 682 $cm^{-1}$ (FIG. 2c).

Figure 3:
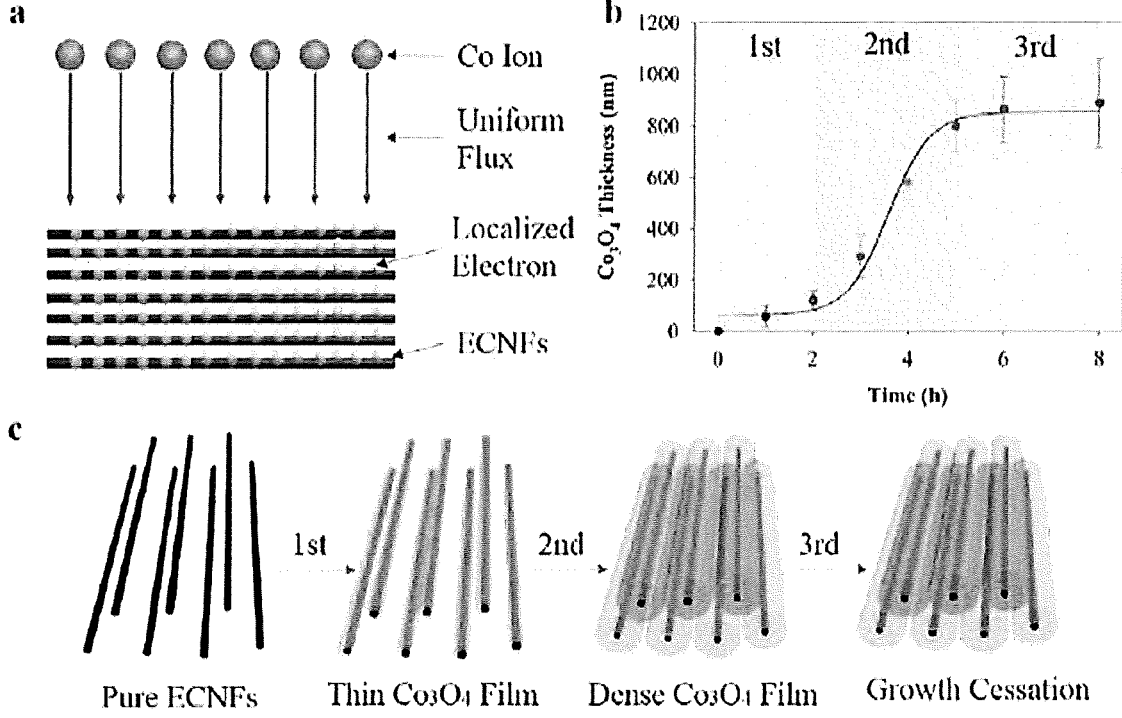
FIG. 3a is a schematic representation of $Co^{2+}$ uniform flux.
FIG. 3b is a graphical representation of time-dependent $Co_3O_4$ growth.
FIG. 3c is a schematic representation of a $Co_3O_4$ growth mechanism.

The $Co_3O_4$ crystal structure was determined for the as-prepared $Co_3O_4$/ECNFs materials using X-ray diffraction (XRD; FIG. 2d). The comprehensive electrodeposition of $Co_3O_4$ originates from the stable structure of ECNFs, which contributes to a uniform $Co^{2+}$ flux (FIG. 3a). The electrochemical reaction occurs according to Equation (1):

$$3 \ CO^{2+} + 4H_2O \rightarrow CO_3O_4 + 8H^+ + 2 \ e^- \qquad \text{Eq. 1}$$

In this growth process, the thickness of the $Co_3O_4$ film can be controlled by the electrodeposition time (FIG. 3b). The growth of the metal oxide film can be analyzed by controlled current electrodeposition kinetics. A general three-step growth model has been derived according to the measured results, and the $Co_3O_4$ thickness (h) versus deposition time (t) has a best fit as follows (Equation (2)):

$$h = h_{max}/(1 + 10^{(r_{as}-1)}(t>0)) \qquad \text{Eq. 2}$$

with $h_{max}$~851 nm and the half-life time constant $\tau_{0.5}$~3.59 h. The time-dependent growth analysis in some instances describes a three-step kinetics mechanism for the electrodeposition (FIG. 3c). The first step involves thin film formation on a boundary layer distributed along the fibers (0-2 h). The second step involves dense film formation and the ECNFs are fully covered (2-5 h). The last step involves the cessation of $Co_3O_4$ growth and the establishment of a uniform, dense film with a self-limiting thickness (>5 h).

III. $Co_3O_4$ Thickness-Dependent Electron Pathway

In an aspect, an increase of $Co_3O_4$ thickness (1-5 h electrodeposition) also increases the number of exchanged electrons (n). The increase in the number of exchanged electrons (n) is due to oxygen and hydrogen peroxide being effectively confined within the aligned $Co_3O_4$/ECNFs system. In some embodiments, hydrogen peroxide molecules generated from a electrochemical reduction of oxygen can be decomposed repeatedly at the surface of a uniform $Co_3O_4$ film formed within an aligned $Co_3O_4$/ECNFs system.

Figure 9:
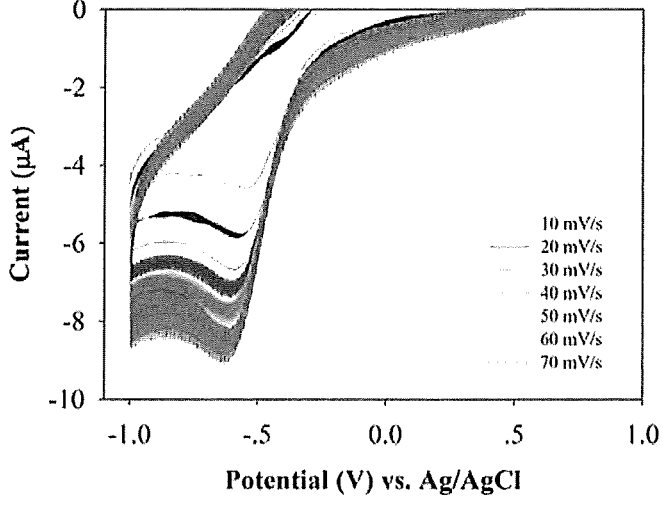
FIG. 9 is a cyclic voltammogram of the ORR at a bare glassy carbon electrode.

The ORR activity was determined through cyclic voltammetric responses of a bare GC electrode. For example, FIG. 9 shows cyclic voltammograms of the ORR at a bare glassy carbon electrode in $O_2$ saturated 20 mM KCl electrolyte solution at scan rates of 10-70 mV s$^{-1}$. The cathodic peak results from the electrochemical reduction of oxygen and the magnitude of the cathodic peaks increases with increasing voltage scan rates. The Butler-Volmer model can be used to describe the electrochemical kinetics of the ORR process. In this case, the slope (slope 1) of a plot of log (peak current) versus peak potential ($E_p$[V]) and Equation (3) are used to determine the transfer coefficient (a):

$$Slope1 = \frac{-\alpha F}{2.3RT} \qquad \text{Eq. 3}$$

where R is the gas constant, F is the Faraday constant, and T is the temperature. In addition, the peak current, $i_p$ [A], is measured as a function of the square root of the voltage scan rate (v[Vs$^{-1}$]). The slope (slope 2) can be used to characterize the concentration of oxygen in the bulk solution (C [mol mL$^{-1}$]) through Randles-Sevcik equation:

$$|Slope\ 2| = (2.99 \times 10^5)n^{3/2}\alpha^{1/2}\ ACD_0^{1/2} \qquad \text{Eq. 4}$$

where n is the exchanged electron number during the electrochemical process (n=2 at a bare GC electrode), A is the active surface area of the bare GC electrode (0.071 cm2), Do is the diffusion coefficient (1.95×10$^{-5}$ cm$^2$s$^{-1}$). When the above constants are applied to an absolute value of slope 2 (obtained from Figure S4), the oxygen concentration of 2.50×10$^{-7}$ mol mL$^{-1}$ can be derived. Changing the range of potential scan rate does not affect the magnitudes of slopes 1 and 2.

Figure 10:
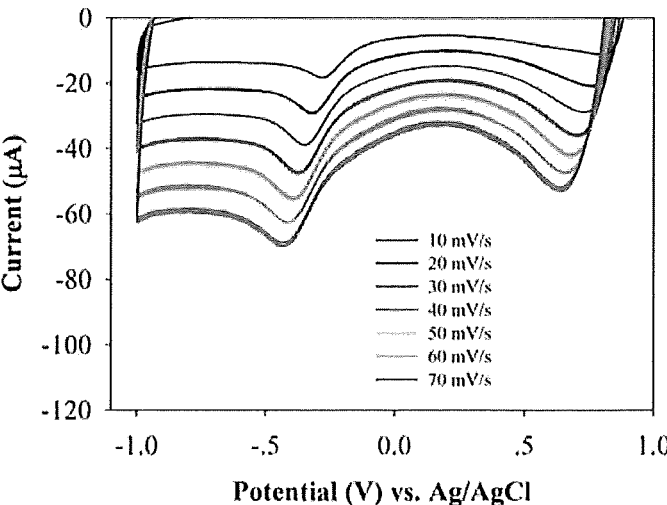
FIG. 10 is a cyclic voltammograms of the ORR at a $Co_3O_4$/ECNFs modified electrode.

The cyclic voltammetric responses of the ORR at the $Co_3O_4$/ECNFs-modified electrode (1-8 h electrodeposition) were examined to find the number of exchanged electrons. The cyclic voltammograms show an increase in the cathodic peak current (at about −0.5 V) with respect to the scan rate (FIG. 10). The cathodic peak presented at about 0.60 V is attributed to the reduction reactions between the $Co^{III}/Co^{II}$ complexes. As described above, Equations (3) and (4) are also used to calculate the number of exchanged electrons in the overall electrochemical processes for electrodes modified with $Co_3O_4$/ECNFs (1-8 h electrodeposition). The numbers of exchanged electrons were found to be 3.09, 3.27, 3.36, 3.43, 3.48, 3.46, and 3.42 for the $Co_3O_4$/ECNFs modified electrodes under electrodeposition times of 1, 2, 3, 4, 5, 6, and 8 h, respectively, as shown in Table 1.

TABLE 1

| Time | Slope 1 | Slope 2 | n |
|------|---------|---------|---|
| 1 h | −1.32 ± 0.11 | (−3.56 ± 0.07) × 10$^{-5}$ | 3.09 ± 0.14 |
| 2 h | −1.43 ± 0.02 | (−4.03 ± 0.12) × 10$^{-5}$ | 3.27 ± 0.09 |
| 3 h | −1.61 ± 0.05 | (−4.46 ± 0.10) × 10$^{-5}$ | 3.36 ± 0.12 |
| 4 h | −1.77 ± 0.04 | (−4.81 ± 0.05) × 10$^{-5}$ | 3.43 ± 0.07 |
| 5 h | −2.10 ± 0.08 | (−5.36 ± 0.04) × 10$^{-5}$ | 3.48 ± 0.06 |
| 6 h | −1.96 ± 0.06 | (−5.13 ± 0.02) × 10$^{-5}$ | 3.46 ± 0.03 |
| 8 h | −1.94 ± 0.06 | (−5.02 ± 0.07) × 10$^{-5}$ | 3.42 ± 0.08 |

Figure 4:
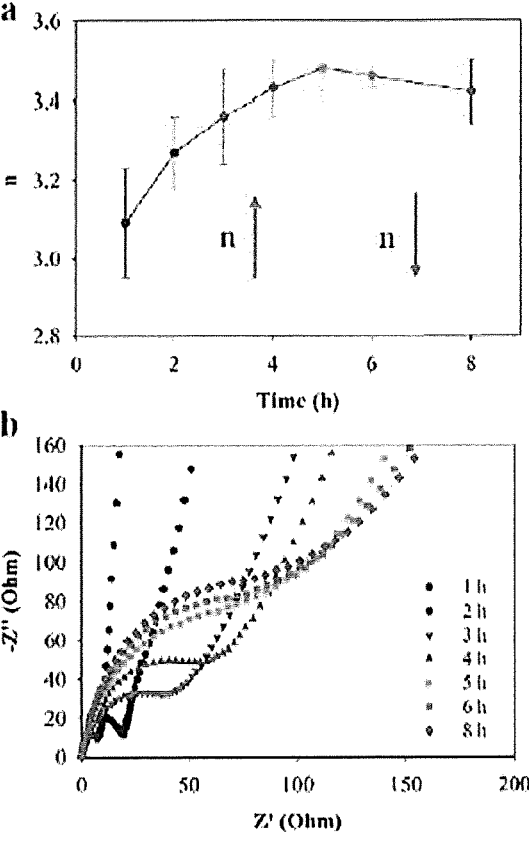
FIG. 4a is a graphical representation of a time-dependent exchanged electron number (n) of the ORR at an electrode modified with $Co_3O_4$/ECNFs in $O_2$-saturated 20 mm KCl electrolyte solution.
FIG. 4b is a graphical representation of an electrochemical impedance spectroscopy at frequencies from 100 kHz to 0.1 kHz.
Figure 11:
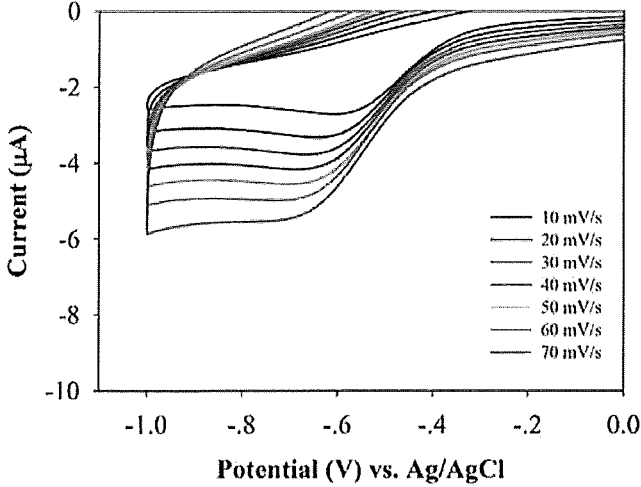
FIG. 11 is a cyclic voltammogram of a $H_2O_2$ reduction reaction at a $Co_3O_4$/ECNFs modified electrode.
Figure 12:
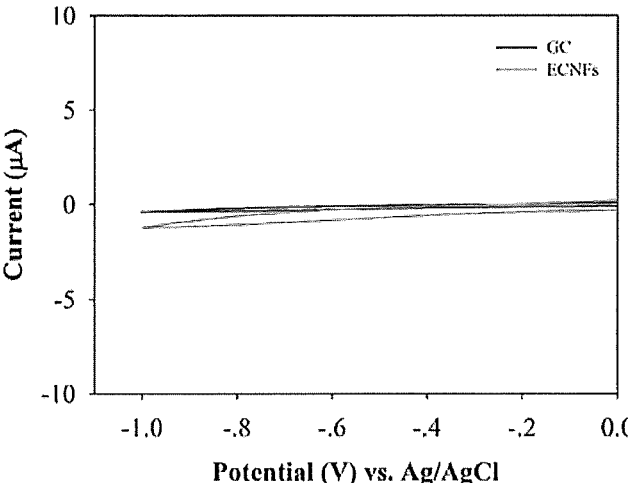
FIG. 12 is a cyclic voltammogram of a $H_2O_2$ reduction reaction at a bare glassy carbon electrode and an ECNFs-modified GC electrode.

FIG. 11 shows the cyclic voltammogram of a $Co_3O_4$/ECNFs-modified electrode in an $N_2$-saturated 20 mm KCl electrolyte solution containing 1 mm hydrogen peroxide at different scan rates. No measurable reduction peak is observed for either a bare GC electrode or an ECNFs-modified GC electrode in the same solution (FIG. 12), so a marked increase in the reduction current at the voltage of the $Co_3O_4$/ECNFs-modified electrode (−0.5 V vs. Ag/AgCl in Figure S9) results from the electrochemical decomposition of hydrogen peroxide taking place at the electrode surface. In some instances, the hydrogen peroxide molecule generated from the electrochemical reduction of oxygen can be decomposed repeatedly at the surface of a uniform $Co_3O_4$ film. Moreover, a 4-electron pathway can have a cycle of oxygen decomposition and regeneration using a $Co_3O_4$/ECNFs-modified electrode. Therefore, in some embodiments, with an increase of $Co_3O_4$ thickness (1-5 h electrodeposition), the number of exchanged electrons (n) increases owing to oxygen and hydrogen peroxide being effectively confined within the aligned $Co_3O_4$/ECNFs system (FIG. 4a).

Although there is no obvious thickness difference for $Co_3O_4$ electrodeposition beyond 5 h in time, a decreased n for $Co_3O_4$/ECNFs electrodes is observed with 6 h (charge transfer resistance &137 W) and 8 h (charge transfer resistance≈149Ω) electrodeposition, likely due to resistance increases. When the electrodeposition time is longer than 5 h, the longer electrodeposition results in a more compact $Co_3O_4$/ECNFs composite (i.e., higher density), causing the internal resistance increase, whereas the apparent thickness of the $Co_3O_4$ film on single ECNF undergoes no obvious change. The resistance was deduced from electrochemical impedance spectroscopy (EIS) Nyquist plots (FIG. 4b) and fitting a Randles circuit model.

IV. Magnetically Enhanced Electron Transfer (MEET)

According to further aspects, magnetic field polarization on unpaired electron spin of $Co_3O_4$ enhances the kinetics of a $Co^{III}/Co^{II}$ redox reaction in $Co_3O_4$/ECNFs catalytic centers. The magnetic field polarization can in some embodiments, advantageously enhance the energy storage capabilities. Furthermore, in such embodiments, coupling of the $Co^{III}/Co^{II}$ redox reaction and the ORR process facilitates a faster rate of oxygen reduction by the $Co_3O_4$/ECNFs to fulfill a nearly 4-electron pathway during the oxygen reduction reaction process. In certain embodiments, the magnetic field provided while charging the supercapacitor is 0.1-0.5 mT, 0.1-1 mT, 0.1-2 mT, 0.1-5 mT, 1-2 mT, or 1-5 mT or higher.

Figure 5:
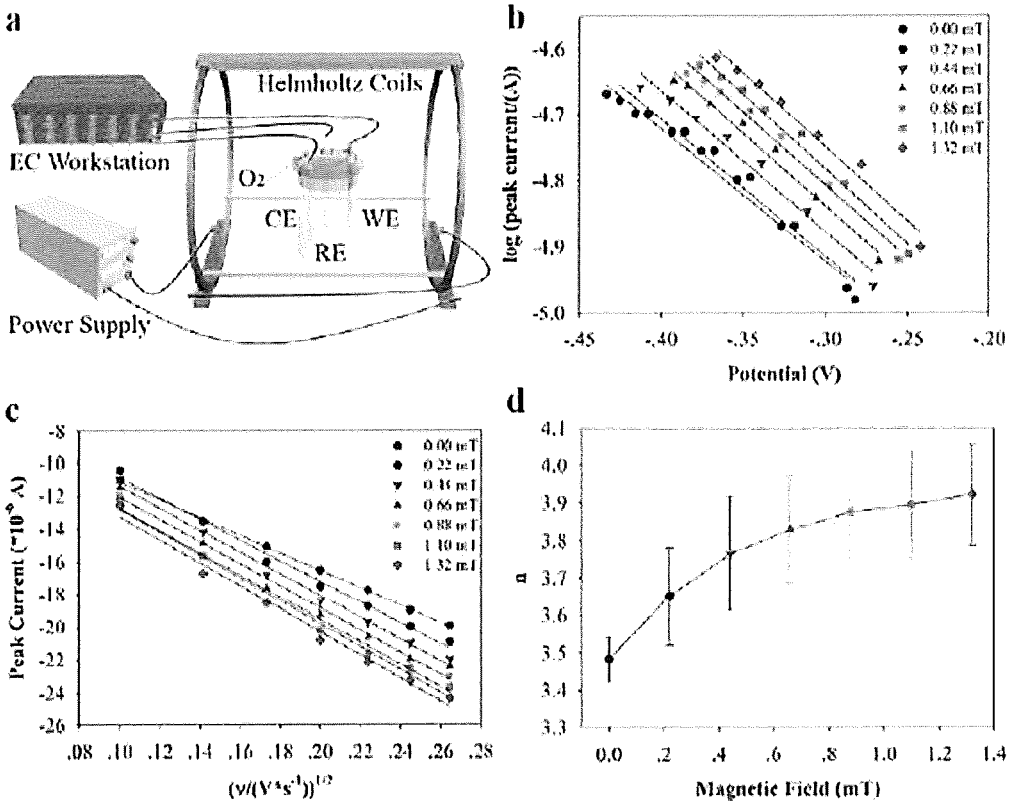
FIG. 5a is a schematic representation of an exemplary magnetic field setup.
FIG. 5b is a graphical representation of a linear dependence of the log of a peak current on the potential for a transfer coefficient calculation.
FIG. 5c is a graphical representation of a linear dependence of a peak current on a square root of a scan rate for an exchanged electron number calculation.
FIG. 5d is a graphical representation of a dependence of an exchanged electron number (n) on a magnetic field applied to the ORR at a GC electrode modified with $Co_3O_4$/ECNFs (5 h electrodeposition)

The cyclic voltammetric responses of the $Co_3O_4$/ECNFs (5 h electrodeposition) modified electrode for ORR were examined under different magnetic fields (FIG. 5a). According to slope 1 [Eq. (3)] from a plot of log (peak current) versus potential (FIG. 5b) and slope 2 [Eq. (4)] from the peak current position on the square root of the voltage scan rate (FIG. 5c), in some embodiments an increased number of exchanged electrons were obtained for the $Co_3O_4$/ECNFs-modified electrodes under magnetic fields of 0.22, 0.44, 0.66, 0.88 mT, 1.10 mT, 1.32 mT (FIG. 5d, Table 2).

TABLE 2

| Magnetic field (mT) | Slope 1 | Slope 2 | n |
|---|---|---|---|
| 0.00 | −2.10 ± 0.08 | (−5.36 ± 0.04) × 10⁻¹⁵ | 3.48 ± 0.06 |
| 0.22 | −2.12 ± 0.14 | (−5.78 ± 0.13) × 10⁻⁵ | 3.65 ± 0.13 |
| 0.44 | −2.14 ± 0.17 | (−6.08 ± 0.14) × 10⁻⁵ | 3.76 ± 0.15 |
| 0.65 | −2.19 ± 0.12 | (−6.31 ± 0.19) × 10⁻⁵ | 3.82 ± 0.14 |
| 0.88 | −2.20 ± 0.11 | (−6.44 ± 0.24) × 10⁻⁵ | 3.87 ± 0.16 |
| 1.10 | −2.25 ± 0.13 | (−6.56 ± 0.18) × 10⁻⁵ | 3.89 ± 0.14 |
| 1.32 | −2.28 ± 0.12 | (−6.67 ± 0.17) × 10⁻⁵ | 3.92 ± 0.13 |

Dependence of the number of exchanged electrons on the magnetic field of the ORR at the electrode modified with $Co_3O_4$/ECNFs (5 h electrodeposition).

Figure 6:
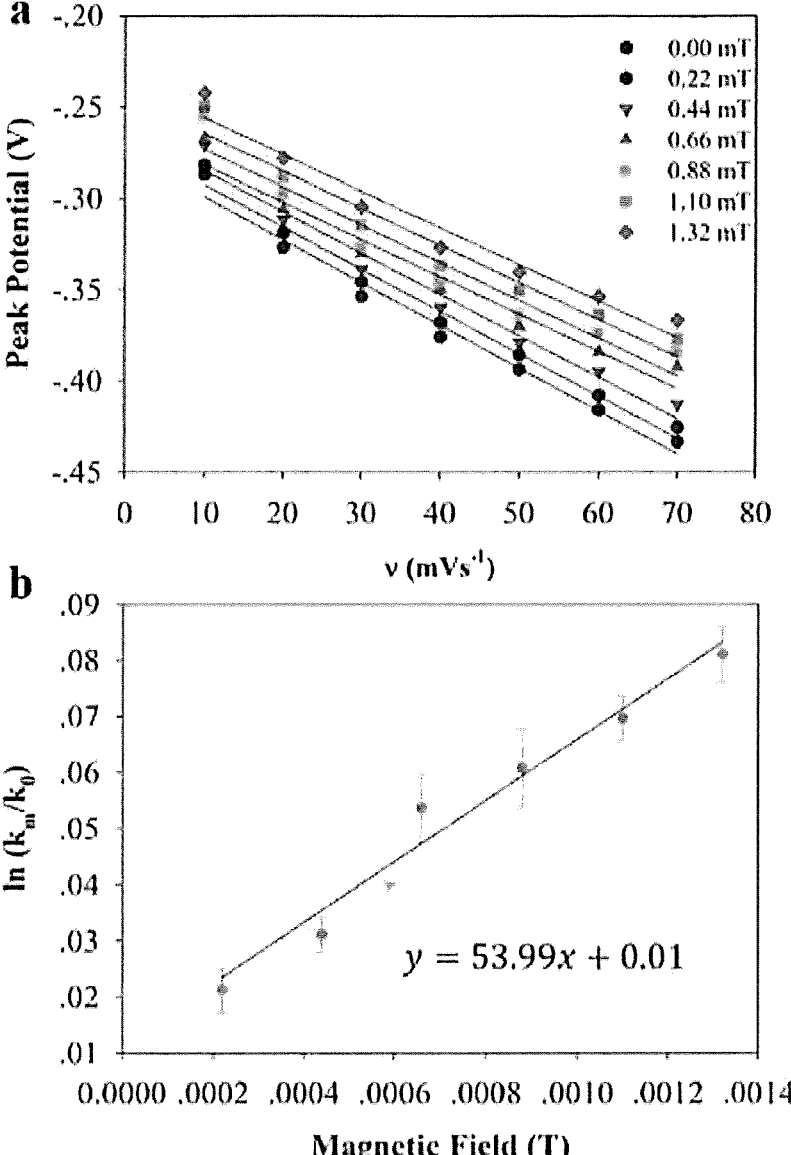
FIG. 6a is a graphical representation of dependence of a peak potential on a scan rate under different magnetic fields of the ORR with an electrode modified with $Co_3O_4$/ECNFs (5 h electrodeposition)
FIG. 6b is a graphical representation of $\ln(k_m/k_0)$ of oxygen reduction versus magnetic field for the electrode modified with $Co_3O_4$/ECNFs with linear fit.

There is no measurable difference in the number of electrons exchanged on the bare GC electrode in absence or presence of an external magnetic field at 1.32 mT. Therefore, an external mT-range magnetic field by itself does not have an effect on oxygen diffusion/transfer due to the applied magnetic field strength. A small difference in this number was observed for the ECNFs-modified electrode in the absence (n≈2.28) and presence (n≈2.35, 3.1% increase) of an external magnetic field at 1.32 mT, indicating that the external mT-range magnetic field can promote the transfer of paramagnetic peroxo radicals along the porous structure of the ECNFs as a result of the Lorentz force. However, in embodiments having the hybrid of $Co_3O_4$ with ECNFs much greater activity (n=3.48 vs. 2.28 at 0 mT) is observed when the external mT-range magnetic field is applied. In other embodiments, $Co_3O_4$ is supported on graphene or carbon nanotubes and has similar increases in activity as $Co_3O_4$/ECNFs. Consequently, the difference (n=3.92 at 1.32 mT vs. 3.48 at 0 mT, corresponding to an increase of 12.6%) in the number of electrons exchanged in the ORR pathway at the hybrid $Co_3O_4$/ECNFs-modified electrode is mainly a result of the magnetic field effect on the $Co_3O_4$ film. Moreover, the magnitude of slope 1 increases with the increase of magnetic field strength (Table 2), due to the occurrence of magnetically enhanced electron transfer (MEET) reactions. Cyclic voltammetry is a tool to probe the electrochemical kinetics of a redox reaction in solution by an electrode. The heterogeneous rate constant can be derived as a function of the shift in observed reduction peak with the scan rate. The established model was used to estimate the heterogeneous electron-transfer rate constant during the ORR process ($k^0_{ORR}$ [cm s⁻¹]):

$$k^0_{ORR} = -2.18\left(\frac{aD_0nFv}{RT}\right)\exp\left(\frac{-2a^2nF(E_0 - E_p)}{RT}\right) \qquad \text{Eq. 5}$$

where $E_0$ is the formal potential determined by the y intercept at a scan rate of 0 mVs⁻¹ (FIG. 6a), $E_p$ is the peak potential at scan rate v, and other parameters are the same as mentioned above. By using the experimental results at different scan rates (20 mVs⁻¹ in Table 3 as an example) combined with the transfer coefficient, number of electrons exchanged, and diffusion coefficient obtained above, the values of heterogeneous electron transfer rate constant are calculated (Table 3):

TABLE 3

| Magnetic field (mT) | $E_0$ (V) | $E_p$ (V) | $2(E_0-E_p)$ (V) | ET rate constant (cm s⁻¹) |
|---|---|---|---|---|
| 0.00 | −0.2755 | −0.3267 | 0.1025 | 0.004509 |
| 0.22 | −0.2692 | −0.3187 | 0.0991 | 0.004606 |
| 0.44 | −0.2621 | −0.3114 | 0.0987 | 0.004651 |
| 0.66 | −0.2612 | −0.3058 | 0.0892 | 0.004786 |
| 0.88 | −0.2524 | −0.2975 | 0.0901 | 0.004792 |
| 1.10 | −0.2443 | −0.2881 | 0.0876 | 0.004834 |
| 1.32 | −0.2360 | −0.2781 | 0.0842 | 0.004890 |

With the rate constants obtained under different magnetic fields, a best fit to the experimentally obtained $\ln(k_m/k_0)$ vs. magnetic field (H[T]) gives the following equation (FIG. 6b):

$$\left(\frac{k_m}{k_0}\right)_{ORR} = \exp(53.99 \cdot H + 0.01) \qquad \text{Eq. 6}$$

where $k_m$ and $k_0$ is the electron transfer rate constant of oxygen reduction with and without magnetic fields, respectively. A similar $Co^{III}/Co^{II}$ redox reaction was observed at the $Co_3O_4$/ECNFs electrode in the presence of oxygen (no redox peaks in the absence of oxygen), suggesting a coupling of the $Co^{III}/Co^{II}$ redox reaction and the ORR process. The magnetic field effect on the electron transfer kinetics of the $Co_3O_4$ electrode system focusing on the $Co^{III}/Co^{II}$ redox couple (a reduction peak at around 0.5 V vs. Ag/AgCl) at ECNFs was further analyzed by using the Laviron method derived for a diffusionless electrochemical redox reaction system, because the $Co^{III}/Co^{II}$ redox reaction occurs in the deposited $Co_3O_4$ film. The standard rate constants (k0) of $Co^{III}/Co^{II}$ were obtained by the fitting of cyclic voltammetry data (FIG. 7a) with the function of overpotential vs. m⁻¹, as expressed by Equation (7):

$$A_z = mn^{-\gamma}\left\{1 - m(1 + \eta)\exp|f(n)|\int_\infty^{-\eta} x^{-(1+\gamma)}\exp|-f(x)|dx\right\} \qquad \text{Eq. 7}$$

where $\overset{\circ}{A}_c$ is the function for the cathodic curve, $\gamma$ is the fitting coefficient, $\eta = \exp[(nF/RT)(E_p - E0)]$, and m=(RT/F) (k⁰/nv). In the absence of an external magnetic field, the standard heterogeneous rate constant for the $Co_3O_4$/ECNFs electrode system is calculated to be about 0.049 s⁻¹. In the presence of an external magnetic field, the standard rate constants are found to be about 0.063, 0.071, 0.079, 0.086, 0.095, and 0.102 s⁻¹ under magnetic fields of 0.22, 0.44, 0.66, 0.88, 1.10, and 1.32 mT (Table 4), respectively.

TABLE 4

| Magnetic Field (mT) | $k_{Co}^0$ (s⁻¹) |
|---|---|
| 0.00 | 0.049 ± 0.011 |
| 0.22 | 0.063 ± 0.005 |
| 0.44 | 0.071 ± 0.008 |
| 0.66 | 0.079 ± 0.004 |
| 0.88 | 0.086 ± 0.007 |
| 1.10 | 0.095 ± 0.003 |
| 1.32 | 0.102 ± 0.004 |

Figure 7:
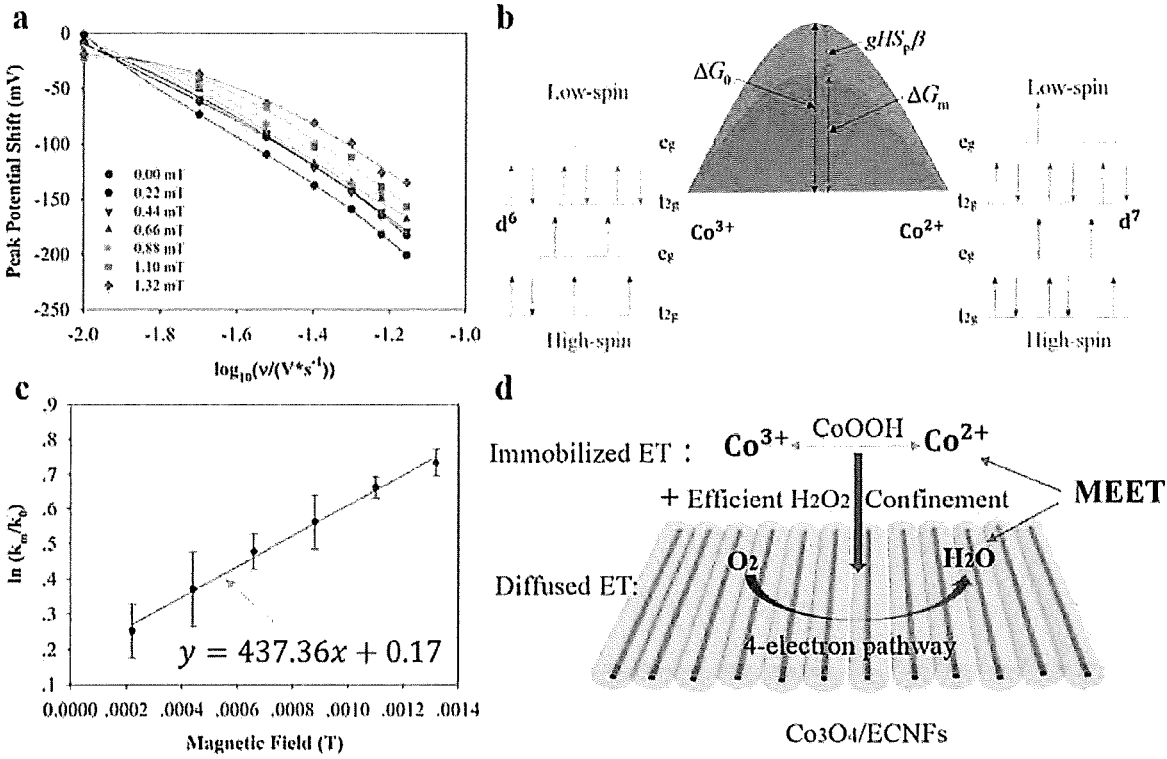
FIG. 7a is a graphical representation of dependence of a peak potential shift on a scan rate under different magnetic fields regarding the electron transfer kinetics of a $Co_3O_4$ electrode system.
FIG. 7b is a schematic representation of the effects of magnetic field effects on an electronic configuration.
FIG. 7c is a graphical representation of $\ln(k_m/k_0)$ versus magnetic field with linear fit regarding the electron transfer kinetics of a $Co_3O_4$ electrode system.
FIG. 7d is a schematic representation of a mechanism of a magnetically enhanced 4-electron pathway.

According to transition state theory, magnetic field-induced degeneracy on unpaired electron spins generates enhanced electron energy states that contribute to the activation energy for electron-transfer reactions. FIG. 7b shows schematically the electronic configurations resulting from electron transfer $$[Co3 + (e_g^0 t_{2g}^6 \text{ or } e_g^2 t_{2g}^4) \text{ to } Co2 + (e_g^l t_{2g}^6 \text{ or } e_g^2 t_{2g}^5)]].$$

The increase in Zeeman energy, $g\beta HS_{p'}$ in $Co^{3+/2+}$ in the presence of a magnetic field contributes to the activation energy by reducing the net enthalpy of the activation barrier and thereby facilitating the redox reaction rate. The electron transfer rate constant ratio at the electrode surface can be expressed in Arrhenius form described in Equation (8):

$$\frac{k_m}{k_0} = \exp\left(\frac{gS_p\beta}{k_B T} \cdot H + \frac{\Delta S_m}{k_B}\right) \qquad \text{Eq. 8}$$

where g is the magnetic response to an applied magnetic field, $S_p$ is electron spin, $\beta$ is the Bohr magneton, $k_B$ is Boltzmann's constant, and $\Delta Sm$ is the magnetically dependent entropy term. Qualitatively, according to Equation (8), the initial energy is shifted by the Zeeman energy under sufficient magnetic field. Quantitatively, a best fit to the experimentally obtained $\ln(k_m/k_0)$ versus H gives the following equation (FIG. 7c):

$$\left(\frac{k_m}{k_0}\right)_{Co} = \exp(437.36 \cdot H + 0.17). \qquad \text{Eq. 9}$$

According to Equations (6) and (9), in an embodiment, the pre-factor (437.36) of MEET for the $Co^{III}/Co^{II}$ redox reaction in the $Co_3O_4$-electrode system is much larger than that (53.99) for the ORR at the electrode surfaces. To this end, a general summary statement of the data analysis and discussion can be reached for the above-discussed embodiments: 1) the magnetic field polarization on unpaired electron spin of $Co_3O_4$ and the energy degeneracy can enhance the kinetics of the $Co^{III}/Co^{II}$ redox reaction ($Co^{2+}$ and $Co^{3+}$ by a CoOOH surface layer) in the $Co_3O_4$/ECNFs catalytic centers (FIG. 7d); and 2) coupling of the $Co^{III}/Co^{II}$ redox reaction and the ORR process facilitate a faster rate of oxygen reduction by the $Co_3O_4$/ECNFs to fulfill a nearly 4-electron pathway during the oxygen reduction reaction process:

$$O_2 \xrightarrow[\text{CO}_3O_3 \xleftrightarrow{\text{MEET}} \text{CoOOH}]{} H_2O \qquad \text{Eq. 10}$$

V. MnO₂ Growth Characterization and Mechanism

Methods for $MnO_2$ electrodeposition onto the well-aligned ECNFs is described herein, where $MnO_2$ electrodeposition onto the ECNFs forms a uniform, dense film of $MnO_2$ having a self-limiting thickness. The alignment of the ECNFs reduces the disordered electron flow, leading to a more uniform electrodeposition process by introducing reaction sites for nucleation of $MnO_2$ crystallites. Methods for preparing well-aligned ECNFs are described below in EXAMPLE 1.

In this embodiment, a uniform layer of the transition metal oxide, $MnO_2$, can be electrodeposited on each of the plurality of ECNFs. The transition metal oxide can include $MnO_2$ that is electrodeposited on each of the plurality of ECNFs, although any other metal oxide or transition metal oxide not inconsistent with the goals of this disclosure can also be electrodeposited, separately or in conjunction with the $MnO_2$. As described below, $Fe_2O_3$ can be co-deposited with $MnO_2$ on ECNFs. In some embodiments, low current electrodeposition techniques are used to grow a fine and firm layer of the metal oxide (e.g., $MnO_2$). The aforementioned fabrication processes (i.e., electrospinning and electrodeposition) are facial and scalable.

In some instances, a constant low current (e.g. 45 μA) was applied for the electrodeposition by an electrochemical workstation for various times ranging from 2 h to 4 h under an $N_2$ atmosphere with an aqueous precursor solution containing 10 mM $MnO_2$ and 100 mm $Na_2SO_4$. The composites' structures and morphologies were characterized by scanning electron microscopy (SEM), where FIGS. 13c and 13d show $MnO_2$/ECNFs at 2 μm and 200 nm, respectively, after 2 h of electrodeposition and FIGS. 13e and 13f show $MnO_2$/ECNFs at 2 μm and 200 nm, respectively, after 4 h of electrodeposition. When the electrodeposition starts, thin films form on the functionalized sites distributed on the fibers (FIGS. 13c and 13d). As electrodeposition continues, the films begin to grow denser/thicker and the fibers are fully covered (FIGS. 13e and 13d).

After electrodeposition of 2 h, small balls around the ECNFs present as "kebab"-like structures. Although the SEM images clearly show surface structures corresponding to these firmly merged balls (FIGS. 13c and 13d), the ECNFs fibers are not fully covered. After electrodeposition for 4 h, the ECNFs with nanofiber diameter of about 206 nm are decorated by a $MnO_2$ film with a thickness of about 1710 nm, making a total diameter of about 1916 nm (FIGS. 13e and 13f). These data corroborate the inference that the ECNFs' alignment promotes the homogenous electron flow and facilitates uniform $MnO_2$ growth.

Figure 14:
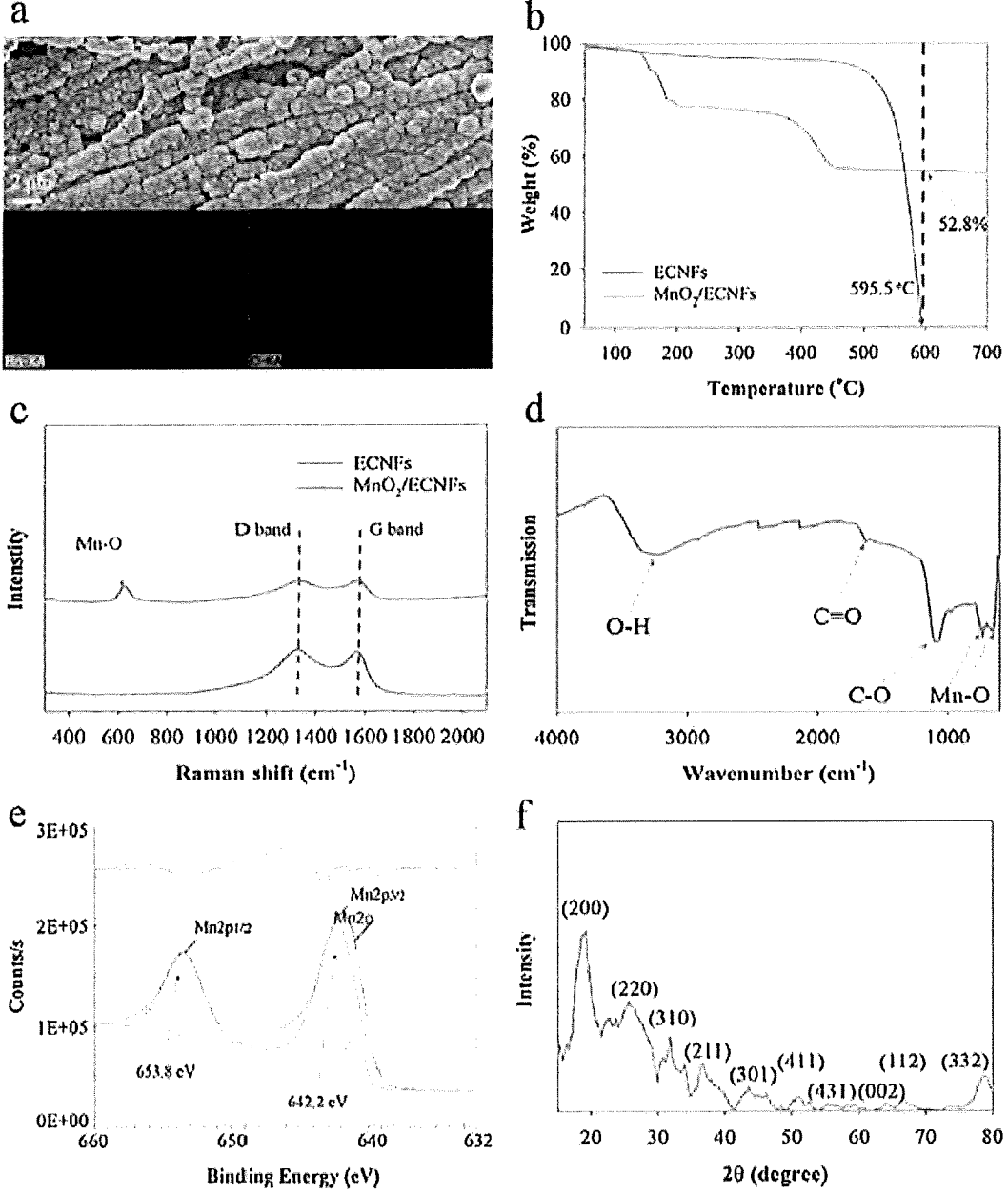
FIG. 14a-14f are characterization of super-aligned ECNFs and $MnO_2$/ECNFs after 4 h electrodeposition time, where

The composites by 4 h electrodeposition were further analyzed by different kinds of techniques. EDX spectrum (FIG. 14a) shows the surface composition is composed of the elements O and Mn. The atomic ratio of O and Mn is close to 2:1, which implies the formation of $MnO_2$. TGA of ECNFs and $MnO_2$/ECNFs to 700° C. in air was shown in FIG. 14b. Due to the residue solvent evaporation, the ECNFs sample shows a weight loss before 425.0° C. And then the ECNFs sample decomposes until 595.5° C. Unlike ECNFs, the $MnO_2$/ECNFs still achieve about 52.8% after 595.5° C., indicating the weight fraction of $MnO_2$ on the $MnO_2$/ECNFs sample is about 52.8%. The success of $MnO_2$ deposition was further confirmed with Raman spectra and FTIR spectra. At Raman shift of 1325 $cm^{-1}$ and 1569 $cm^{-1}$, the ECNFs sample shows D-band and G-band, respectively. While, for the $MnO_2$/ECNFs sample, Mn—O presents at the Raman shift of 624 $cm^{-1}$ (FIG. 14c). Correspondingly, v(Mn—O) presents at the wavenumber of 643 $cm^{-1}$ and 727 $cm^{-1}$ according to the FTIR spectra (FIG. 3d). And IR transitions at 1176, 1647, and 3263 $cm^{-1}$ are assigned to v(C—O), v(C=O), and v(O—H), respectively. The chemical composition of the $MnO_2$/ECNFs sample was also investigated by the XPS. The high resolution Mn 2p spectra for $MnO_2$/ECNFs is presented in FIG. 14e. Two strong peaks at 642.2 and 653.8 eV can be clearly seen, corresponding to the Mn $2p^{3/2}$ and Mn $2p^{1/2}$ spin—orbit peaks of $MnO_2$, respectively. Furthermore, the crystal structures of the as-prepared $MnO_2$/ECNFs were also recorded by XRD (FIG. 14f), the patterns of which can be fully indexed to α-$MnO_2$ (JCPDS No. 44-0141).

Herein, the excellent electrodeposition of $MnO_2$ originates from the stable structure of ECNFs, which contributes to a uniform $Mn^{2+}$ flux. The electrochemical reaction occurs according to:

$$Mn^{2+}+2H_2O \rightarrow MnO_2+4H^++2e^- \qquad \text{Eq. 11}$$

It is known that $MnO_2$ has different main structural motifs due to edge- or corner-sharing $MnO_6$ octahedra in different connectivity schemes, resulting in different tunnels extending in a direction parallel to the unit cell. Here, the cations (Na+) were introduced during the synthesis process, but the 1×1 tunnels (with a size of 0.189 nm) are generally too small for Na+ to stabilize the structure, consequently resulting in the formation of $\alpha$-$MnO_2$ due to structurally constructed from the double chains of edge-sharing $MnO_6$ octahedra which are linked at the corners to form 2×2 (with a size of 0.460 nm) and 1×1 tunnel structures. The crystal structure was confirmed by the XRD analysis of $MnO_2$/ECNFs by electrodeposition for 2 h and 4 h. Meanwhile, these cations inside 2×2 tunnels of $\alpha$-$MnO_2$ increase the electronic conductivity of the $MnO_2$/ECNFs system, which indirectly enhance the electrodeposition of $\alpha$-$MnO_2$.

VI. Catalytic Properties of $MnO_2$/ECNFs

Figure 15:
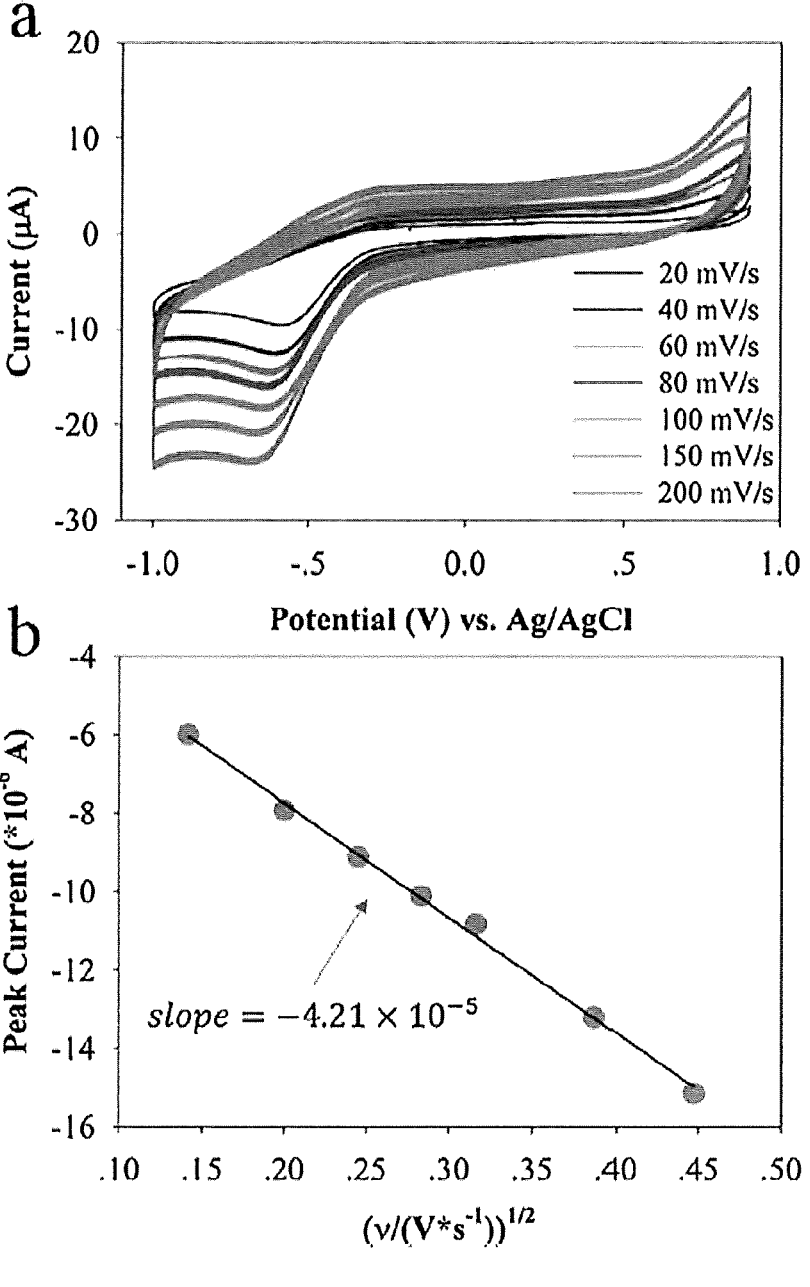
FIG. 15a is cyclic voltammograms of the ORR at a bare glassy carbon electrode in $O_2$ saturated 20 mM KCl electrolyte solution at different scan rates.
FIG. 15b is a graphical representation of linear dependence of the peak current on the square root of the voltage scan rate for an $O_2$ concentration calculation.

The ORR activity was firstly conducted by studying the cyclic voltammetric responses of a bare GC electrode (FIG. 15a). The cathodic peak results from the electrochemical reduction of oxygen and the magnitude of the cathodic peaks increases with increasing of the voltage scan rates. In addition, the peak current, $i_p$ (A), is measured as a function of the square root of the voltage scan rate (v(V/s)), which is found to exhibit a linear dependence (FIG. 15b). The dependence of the peak current position on the square root of the voltage scan rate for the bare GC electrode without modification can be firstly used to characterize the concentration of oxygen in the bulk solution (C, mol/mL) through Randles-Sevcik equation (Note that the slope is obtained from the dependence of $i_p$ (A) on v(V/s)):

$$|\text{stope}|=(2.99 \times 10^5)n^{3/2}\alpha^{1/2}ACD_0^{1/2} \qquad \text{Eq. 12}$$

where n is the number of electrons exchanged during the electrochemical process, a is the transfer coefficient (reported value of 0.26), A is the active surface area of the bare GC electrode (0.071 $cm^2$), Do is the diffusion coefficient (reported value of $1.95 \times 10^{-5}$ $cm^2$/s). Since the reduction of oxygen to hydrogen peroxide is known at the bare GC electrode, the number of electrons exchanged is 2. When the above constants are applied for absolute value of the slope obtained from FIG. 15b, the oxygen concentration of $3.11 \times 10^{-7}$ mol/mL is extracted.

Figure 16:
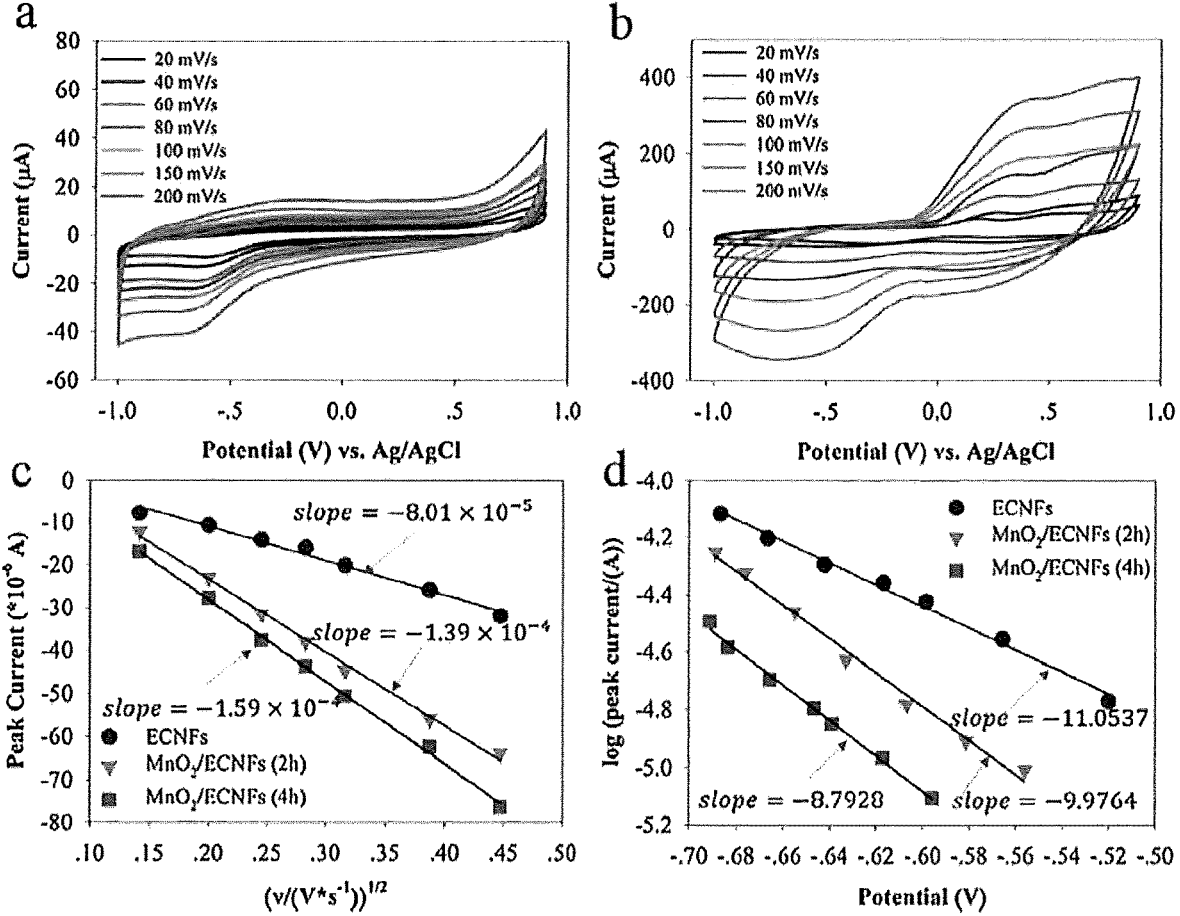
FIG. 16a is a cyclic voltammograms of the ORR at an electrode modified with super-aligned ECNFs.
FIG. 16b is a cyclic voltammograms of the ORR at an electrode modified with $MnO_2$/ECNFs (4 h electrodeposition) in $O_2$ saturated 20 mM KCl electrolyte solution at different scan rates.
FIG. 16c is a graphical representation of a linear dependence of the peak current on the square root of the scan rate for the number of electrons exchanged calculation for an electrode modified with $MnO_2$/ECNFs (4 h electrodeposition)
FIG. 16d is a graphical representation of a linear dependence of the log of the peak current on the potential for the transfer coefficient calculation for an electrode modified with $MnO_2$/ECNFs (4 h electrodeposition)

The cyclic voltammetric responses of the ECNFs modified electrode and $MnO_2$/ECNFs (2 h and 4 h) modified electrode were examined by varying the scan rates from 20 mV/s to 200 mV/s, which also show an increase in the cathodic peak current with respect to the scan rate as shown in FIGS. 16a and 16b. In comparison, there is a marked enhancement in the ORR of the electrode modified with $MnO_2$/ECNFs (4 h). Note that the anodic peak presented at 0.32 V is attributed to the oxidation reactions between the Mn(IV)/Mn(III) complexes. As mentioned above, Eq. (12) is also used to calculate the number of electrons in the overall electrochemical processes for electrodes modified with super-aligned ECNFs and $MnO_2$/ECNFs. The peak currents are directly proportional to the square roots of scan rates for both modified electrodes with a slope of $-8.01 \times 10^{-5}$ (ECNFs modified electrode) and $11.59 \times 10^{-4}$ ($MnO_2$/ECNFs (4 h) modified electrode), respectively (FIG. 16c). Moreover, the slope of a plot of log ($i_p$) ($i_p$ is in unit of A) versus potential (potential is in unit of V) (FIG. 16d) and the following equation is used to determine the transfer coefficient:

$$\text{Slope} = \frac{-\alpha F}{2.3RT} \qquad \text{Eq. 13}$$

where R is the gas constant, F is the Faraday's constant, and T is the temperature. The transfer coefficient is obtained to be 0.65 (ECNFs modified electrode) and 0.52 ($MnO_2$/ECNFs (4 h) modified electrode), respectively. By using Eq. (12), this value can then be coupled with the active surface area, the diffusion coefficient of oxygen, and the concentration of oxygen to extract the number of electrons exchanged as 2.26 (ECNFs modified electrode) and 3.84 ($MnO_2$/ECNFs (4 h) modified electrode), respectively. Meanwhile, in comparison, with a transfer coefficient of 0.58 (FIG. 16d) and a slope of $-1.39 \times 10^{-4}$ (FIG. 5c), the number of electrons exchanged is obtained to be 3.37 for the $MnO_2$/ECNFs (2 h) modified electrode, because the oxygen and hydrogen peroxide are not effectively confined within the imperfectly fiber-covered $MnO_2$/ECNFs-GC system. As expected, the voltammetric curve of an ECNFs modified electrode exceeds a 2-electron transfer ORR through an energetically favored association to assist the adsorption and reduction of oxygen molecules, which is characteristics of the activity of ECNFs. However, for the $MnO_2$/ECNFs modified electrode, considering that the hydrogen peroxide molecule generated from the electrochemical reduction of oxygen to be decomposed repeatedly at the surface of a uniform $MnO_2$ film, a nearly 4-electron pathway contributed with cycles of oxygen decomposition/regeneration.

Figure 17:
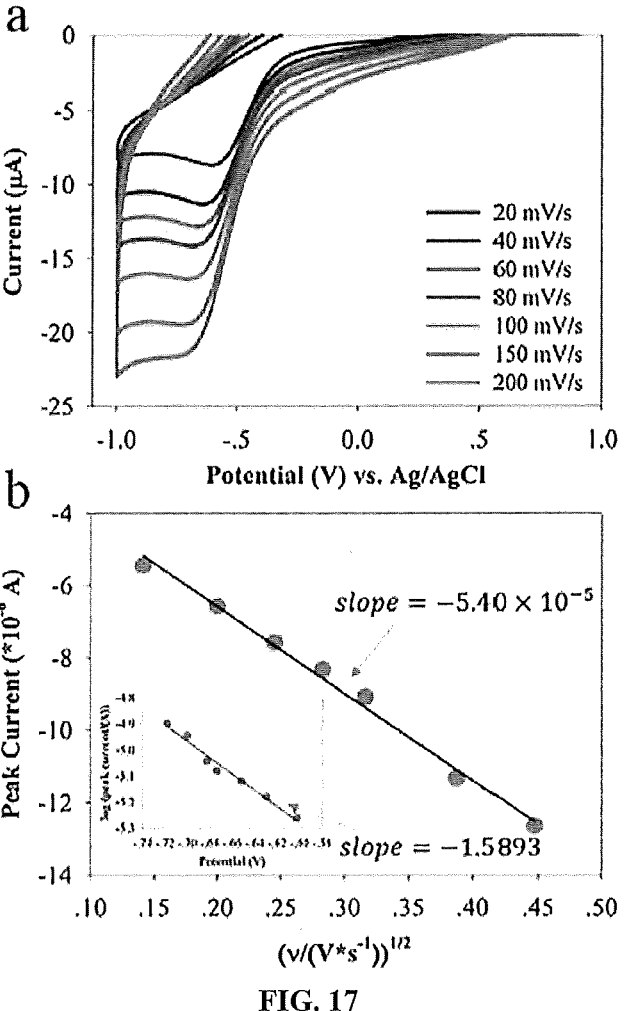
FIG. 17a is a cyclic voltammograms of the $H_2O_2$ reduction reaction at the electrode modified with $MnO_2$/ECNFs (4 h) in $N_2$ saturated 20 mM KCl electrolyte solution with 1 mM $H_2O_2$ at different scan rates.
FIG. 17b is a graphical representation of linear dependence of the peak current on the square root of the scan rate for the number of electrons exchanged calculation, inserted with the linear dependence of the log of the peak current on the potential for a transfer coefficient calculation.

Since the catalytic decomposition of hydrogen peroxide typically follows first order kinetics, hydrogen peroxide decomposition at the surface of a uniform $MnO_2$ film (4 h) was investigated, were a cyclic voltammogram of a $MnO_2$/ECNFs modified electrode was studied in an $N_2$ saturated 20 mM KCl electrolyte solution with 1 mM hydrogen peroxide at different scan rates (FIG. 17a). No measureable reduction peak shows for an ECNFs modified electrode in an $N_2$ saturated 20 mM KCl electrolyte solution with 1 mM hydrogen peroxide. However, a marked increase in the voltammetric performance of the $MnO_2$/ECNFs modified electrode was observed as a result from the electrochemical decomposition of hydrogen peroxide successfully taking place at the electrode surface. Furthermore, in the same way, slope of the plot of log (ip) versus potential (FIG. 17b inserted subgraph) and Eq. (13) were used to determine the transfer coefficient of 0.09. When the constants of active surface area (0.071 $cm^2$), diffusion coefficient of hydrogen peroxide (reported value of $1.0 \times 10^{-5}$ $cm^2$/s) and concentration of hydrogen peroxide ($1.0 \times 10^{-6}$ mol/mL) are applied for the slope obtained from the $MnO_2$/ECNFs modified electrode (FIG. 17b), a n value of 1.91 is extracted. This highly supports that the hydrogen peroxide molecules generated from the electrochemical reduction of oxygen are decomposed by the uniform $MnO_2$ film. The hydrogen peroxide decomposition by the uniform $\alpha$-$MnO_2$ film can likely be ascribed to at least two reasons: one is the open crystal structure of $\alpha$-$MnO_2$ with 2×2 tunnels providing favorable surface coordination, such as the higher Miller index (211) and (112) surfaces expressed in the XRD results; and the other is the low oxygen vacancy formation energy providing a favorable thermodynamic pathway for catalytic processes, such as 1.09 eV for (211) and 0.07 eV for (112).

Figure 18:
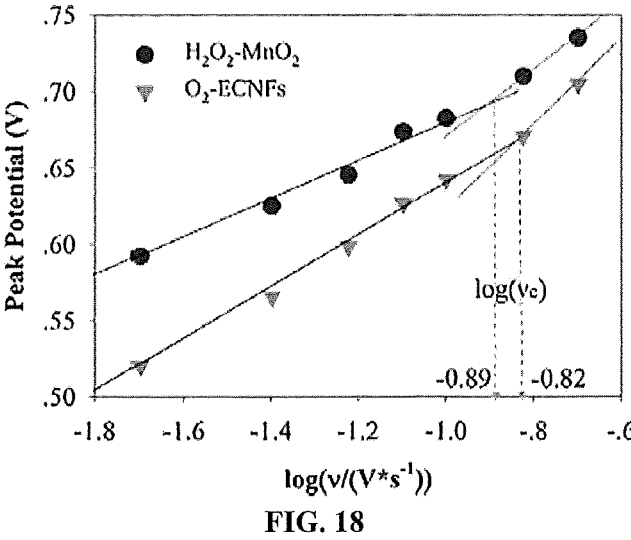
FIG. 18 is a graphical representation of peak potential versus log of scan rate for critical scan rate determination under the conditions of $H_2O_2$—$MnO_2$ and $O_2$-ECNFs.

To compare the rate of the hydrogen peroxide generation by ECNFs modified electrodes ($O_2$-ECNFs) with the hydrogen peroxide decomposition by $MnO_2$/ECNFs modified electrode ($H_2O_2$—$MnO_2$), the electron transfer kinetics should be taken into account. The Gileadi method based upon the determination of critical scan rate ($v_c$) was further used to evaluate the heterogeneous electron transfer rate constant ($k^0$). When the experimental results from $O_2$-ECNFs and $H_2O_2$—$MnO_2$ are applied for this analysis, the critical scan rate can be found from the intersection of two lines as FIG. 18 shows. Then the following equation was used to calculate the $k^0$(cm/s):

$$\log(k^0) = -0.48\alpha + 0.52 + \log\left[\frac{nF\alpha v_c D_0}{2.303RT}\right]^{1/2} \qquad \text{Eq. 14}$$

By using this method, associated with the transfer coefficient, number of electron transfer, and diffusion coefficient obtained above, the value of heterogeneous electron transfer rate constant for $O_2$-ECNFs and $H_2O_2$—$MnO_2$ is calculated to be $1.30 \times 10^{-2}$ cm/s and $1.37 \times 10^{-2}$ cm/s, respectively. The rate of hydrogen peroxide decomposition by $MnO_2$/ECNFs modified electrode is faster than the electrochemical generation process by ECNFs modified electrodes, which may be partly ascribed to the presence of K+ inside the 2×2 tunnels of the $\alpha$-$MnO_2$ enhancing the electrocatalytical performance of the catalyst.

VII. 4-electron pathway mechanism for $MnO_2$/ECNFs

Figure 19:
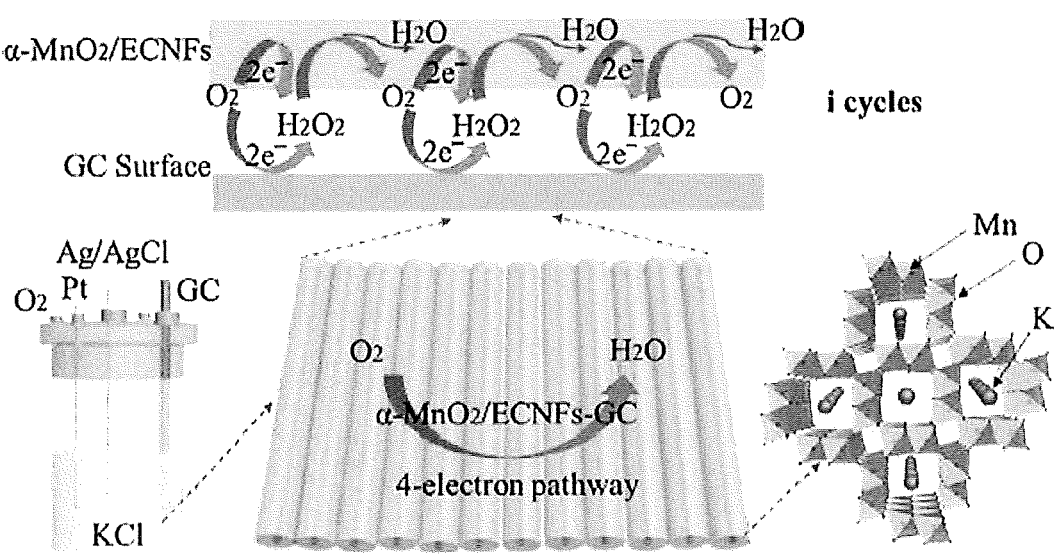
FIG. 19 is a schematic representation of a 4-electron pathway mechanism by the bifunctional catalyst $\alpha$-$MnO_2$/ECNFs-GC electrode.

A 4-electron pathway mechanism is shown in FIG. 19 based on the catalytic activity analysis in Section V above. When the oxygen molecule has been adsorbed onto the $MnO_2$/ECNF-GC electrode surfaces, the redox between $MnO_2$ species assists the charge transfer involved in oxygen reduction, and the first step undergoes a 2-electron pathway forming hydrogen peroxide (Eq. (15)):

$$O_{2\ ads} + 2H^+ + 2e^- \rightarrow H_2O_2 \qquad \text{Eq. 15}$$

The electrochemically generated hydrogen peroxide can then be decomposed to water via a disproportionation reaction before it escapes into the bulk solution by a uniform $\alpha$-$MnO_2$ film (Eq. (16)), though an electrochemical decomposition to OH$^-$ may occur:

$$2H_2O_2\alpha - \xrightarrow{MnO_2} O_2 + 2H_2O \qquad \text{Eq. 16}$$

The rate of hydrogen peroxide decomposition by $\alpha$-$MnO_2$/ECNFs modified electrode is faster than the electrochemical generation process by ECNFs modified electrode, and the presence of K+ inside the 2×2 channels of the $\alpha$-$MnO_2$ has a strong beneficial effect on the electrochemical performance of the catalyst, which improves the efficiency of the ORR process shown above in the results. A half of the oxygen concentration shown in Eq. (16) is electrochemically regenerated after each cycle, which reduces the risk of the fuel cell degradation for practical uses. As a result, Eq. (15) and Eq. (16) occurring in series give the $\alpha$-$MnO_2$/ECNF-GC catalytic system as much efficiency as a 4-electron pathway:

$$O_2 + 4H^+ + 4e^- \rightarrow 2H_2O \qquad \text{Eq. 17}$$

Considering that a cycle of decomposition/regeneration of a half of the oxygen concentration at the $MnO_2$/ECNF-GC electrode, the contribution for the electron pathway from the bifunctional catalyst can be divided into two parts, i.e. the first 2-electron transfer oxygen reduction to hydrogen peroxide at the GC-$MnO_2$ interfaces, and following hydrogen peroxide decomposition at the $\alpha$-$MnO_2$ surfaces. FIG. 19 shows the proposed reactions where i is the number of cycles regarding the reduction of oxygen and regeneration of oxygen with respect to the oxygen and hydrogen peroxide confinement ability. The total number electron pathway can be expressed:

$$N = 2\sum_{i=0}^{\infty}\left(\frac{1}{2}\right)_{GC-MnO_2} + 2\sum_{i=0}^{\infty}\left(\frac{1}{2}\right)_{MnO_2} \qquad \text{Eq. 18}$$

where N is the number-electron pathway, sigma notation is the contribution from different parts, and i is the number of cycles regarding the reduction of oxygen and regeneration of oxygen with respect to the oxygen and hydrogen peroxide confinement ability in the aligned $MnO_2$/ECNFs structures. As the result analysis provided above, the number of electrons exchanged is obtained to be 3.37 (i is estimated to be 3) for the 2-hour electrodeposited $MnO_2$/ECNF electrode ($MnO_2$ ununiformly covered at ECNFs), because the oxygen and hydrogen peroxide are not completely reduced within the $MnO_2$/ECNFs-GC system due to the insufficient catalytic activity and confinement (number of cycling). Whereas at 4-hour deposited $MnO_2$/ECNFs, the number of electrons exchanged is achieved to be at least 3.84, suggesting a large cycle number (namely good confinement, i is estimated to be 5) and excellent catalytic activity are obtained from the uniform electrodeposition of $\alpha$-$MnO_2$ on ECNFs.

Figure 21A:
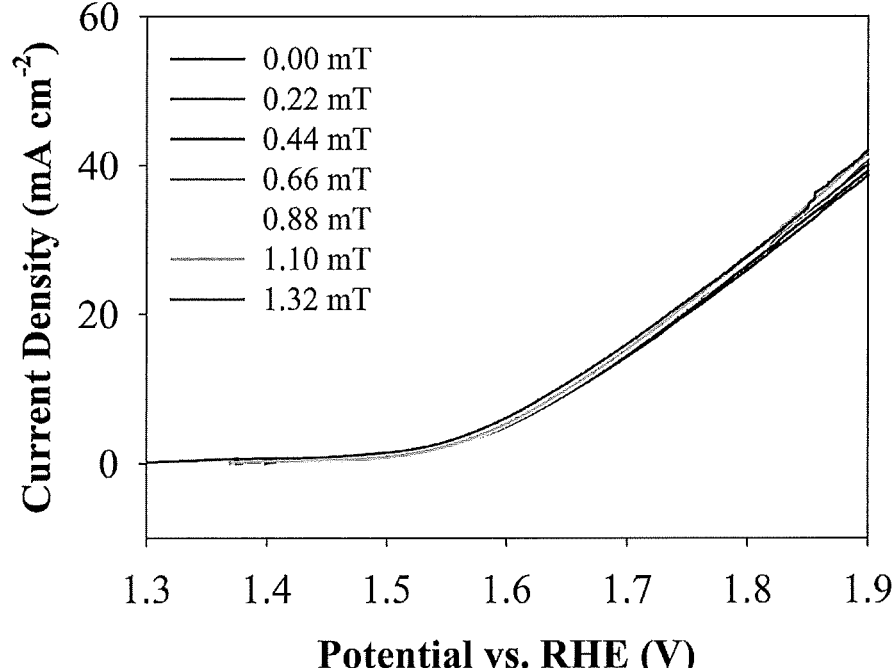
FIG. 21a illustrates OER current densities for $MnO_2$ coated ECNFs fabricated according to methods described herein under applied magnetic fields of varying strength, according to some embodiments.
Figure 21B:
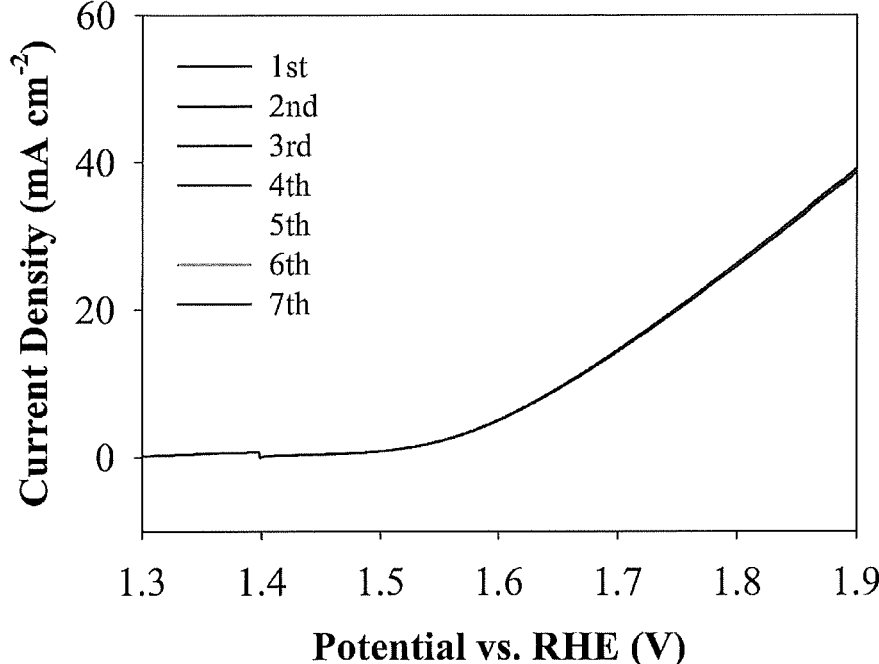
FIG. 21b illustrates OER current densities for $MnO_2$ coated ECNFs in the absence of magnetic field application, according to some embodiments.

OER activity was also investigated for $MnO_2$ coated ECNFs. FIG. 21a illustrates OER current densities for $MnO_2$ coated ECNFs fabricated according to methods described herein. Magnetic fields of varying strength were applied during the OER reaction. FIG. 21b illustrates OER current densities for $MnO_2$ coated ECNFs in the absence of magnetic field application. Presence of the magnetic field produced slightly higher current densities for OER.

In summary, the methods described herein demonstrate a new strategy for uniformly electrodepositing an $\alpha$-$MnO_2$ film on aligned ECNFs. In contrast to earlier studies with an inhomogeneous surface coverage, the reported $\alpha$-$MnO_2$ film with a 4 h-45 mA electrodeposition was uniform with a thickness of 1710 nm. From the electrocatalytic performance studies, the bifunctional catalyst system of $\alpha$-$MnO_2$/ECNFs-GC displayed a 3.84-electron pathway through the rapid decomposition of hydrogen peroxide at the $\alpha$-$MnO_2$ surfaces. The analysis of electron transfer kinetics suggested a faster hydrogen peroxide decomposition than its generation from reduction of oxygen, and a two-step four-electron pathway cycling mechanism was proposed to give an insightful understanding of the electrocatalytic ORR at the bifunctional catalyst system. These findings represent significant improvement in stable metal oxide/carbonaceous nano-material-based oxygen reduction catalysts.

Example 1

Fabrication of Super-Aligned ECNFs

A 10 wt % polyacrylonitrile (PAN; $M_w$=150000) solution in dimethylformamide was electrospun onto the collector. The applied positive voltage was 18 kV and the distance between the needle tip and the collector was 15 cm. The collector maintained a rate of 2000 rpm during the electrospinning process to form well-aligned precursors. The obtained sheets were then put into an oxidation and annealing furnace for stabilization to ensure that the fibers did not melt during pyrolysis. The heating rate was $1°$ C. $\text{min}^{-1}$ from room temperature to $280°$ C. and after which this temperature was maintained for 6 h. The as-stabilized nanofibers were finally carbonized at $1200°$ C. for 1 h at a heating rate of $5°$ C. $\text{min}^{-1}$ under $N_2$ atmosphere to yield high mechanical strength ECNFs.

Example 2

$Co_3O_4$ Electrodeposition on ECNFs

After the well-aligned ECNFs were prepared according to Example 1, $Co_3O_4$ was electrodeposited onto 1 $\text{cm}^2$ ECNFs with a three-electrode setup with a charging current of 50 mA performed on a bio-logic VMP3 electrochemical workstation. Here, a gold electrode coated with ECNFs, a platinum wire, and Ag/AgCl were used as the working electrode, the counter electrode, and the reference electrode, respectively. To assure that the deposition of $Co_3O_4$ took place uniformly and firmly at the ECNFs' surfaces, the ECNFs electrode was pretreated with 2% $HNO_3$ solution at $60°$ C. for 2 h to introduce OH and COOH groups to facilitate the deposition. An aqueous precursor solution containing 20 mm $Co_5O_4$ and 100 mm $Na_2SO_4$ was used as the supporting electrolyte. After deposition, the working electrodes were washed with deionized water and the samples were dried.

Example 3

$MnO_2$ Electrodeposition on ECNFs

Figure 20:
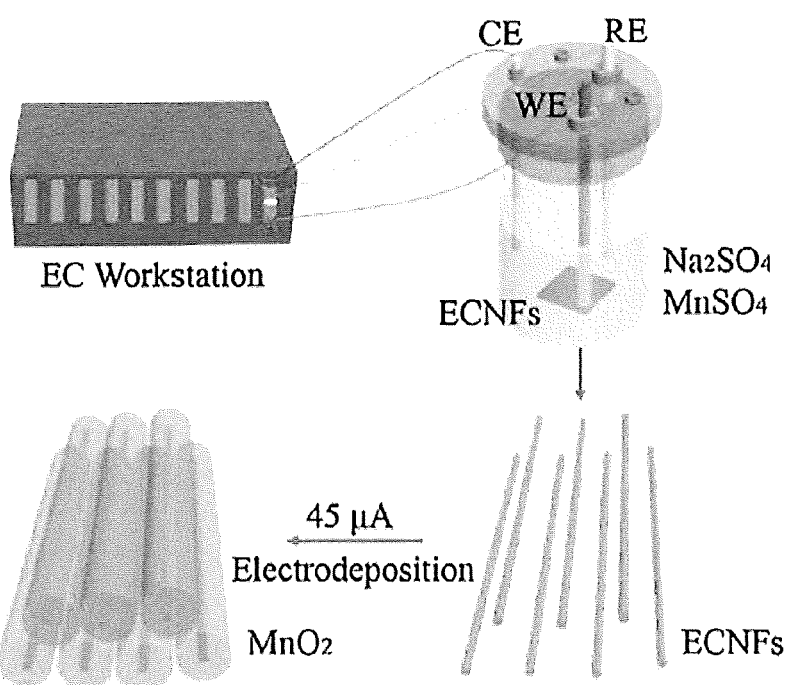
FIG. 20 is a schematic representation of a method of uniform electrodeposition of $MnO_2$ on super-aligned ECNFs.

After the super-aligned ECNFs were prepared according to Example 1, $MnO_2$ was electrodeposited onto 1 $\text{cm}^2$ ECNFs with a three-electrode setup using a charging current of 45 µA performed on a Bio-logic VMP3 electrochemical (EC) workstation (FIG. 20). Here, a gold electrode taped with ECNFs, a platinum wire, and an Ag/AgCl were used as the working electrode (WE), the counter electrode (CE), and the reference electrode (RE), respectively. To assure that the deposition of $MnO_2$ took place uniformly and firmly at the ECNFs' surfaces, the ECNFs electrode was prior-treated with 4 M $HNO_3$ solution at $70°$ C. for 2 h to introduce —OH and —COOH groups to facilitate the deposition. An aqueous precursor solution containing 10 mM $MnSO_4$ and 100 mM $Na_2SO_4$ was used as the supporting electrolyte. After the deposition, the working electrodes were washed with deionized water and then dried at $80°$ C. for 3 h.

Example 4

$Fe_2O_3$ Electrodeposition on ECNFs

After the super-aligned ECNFs were prepared, $Fe_2O_3$ was electrodeposited onto 1 $\text{cm}^2$ ECNFs with a three-electrode setup using a charging current of 50 µA performed on a bio-logic VMP3 electrochemical workstation. Here, a gold electrode taped with ECNFs, a platinum wire, and an Ag/AgCl were used as the working electrode, the counter electrode, and the reference electrode (Fisher Scientific), respectively. To assure that the deposition of $Fe_2O_3$ took place uniformly and firmly at the ECNFs' surfaces, the ECNFs electrode was prior-treated with 4 M $HNO_3$ (J. T. Baker) solution at $70°$ C. for 2 h to introduce —OH and —COOH groups to facilitate the deposition. An aqueous precursor solution containing 100 mM $FeSO_4$ (ACROS Organics) was used as the supporting electrolyte. After deposition, the working electrodes were washed with deionized water and then dried at $80°$ C. for 5 h.

Figure 22A:
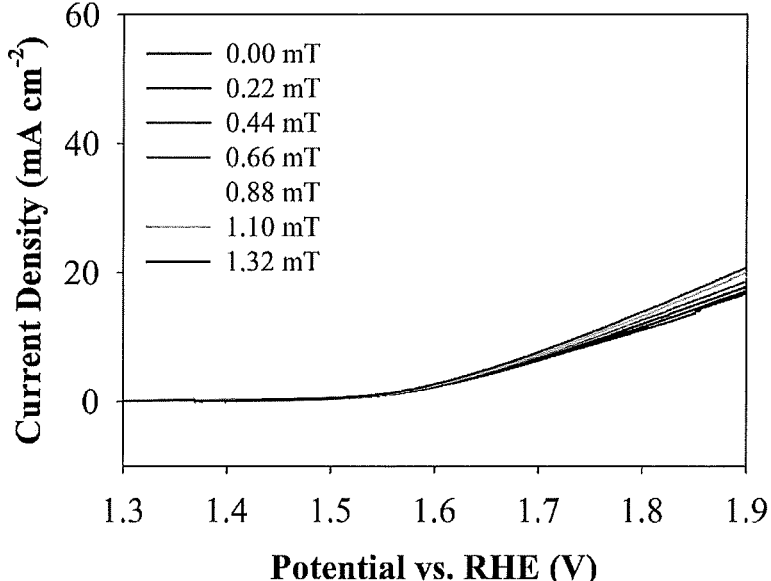
FIG. 22a illustrates OER current densities for the $Fe_2O_3$ coated ECNFs under application of magnetic fields of varying strength, according to some embodiments.
Figure 22B:
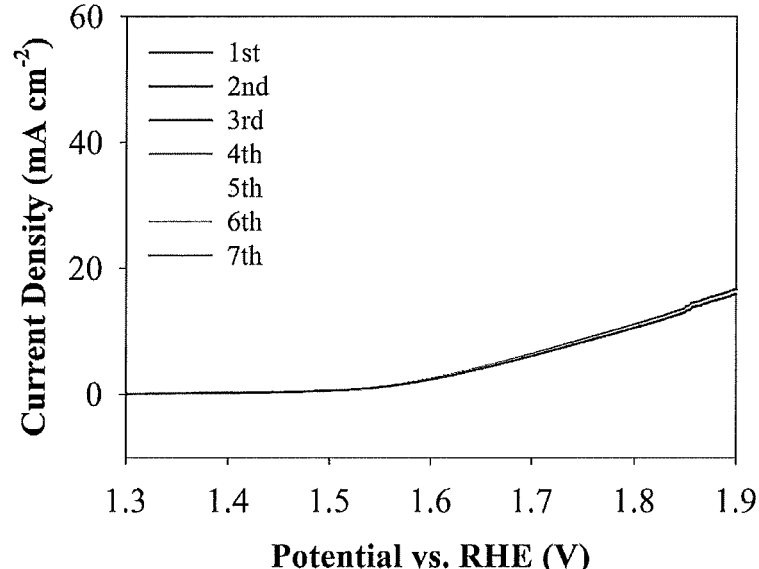
FIG. 22b illustrates OER current densities for the $Fe_2O_3$ coated ECNFs in the absence of magnetic field application, according to some embodiments.

The $Fe_2O_3$ coated ECNFs were tested for OER activity. FIG. 22a illustrates OER current densities for the $Fe_2O_3$ coated ECNFs under application of magnetic fields of varying strength. FIG. 22b illustrates OER current densities for the $Fe_2O_3$ coated ECNFs in the absence of magnetic field application.

Example 5

$Fe_2O_3$—$MnO_2$ Electrodeposition on ECNFs

Figure 23:
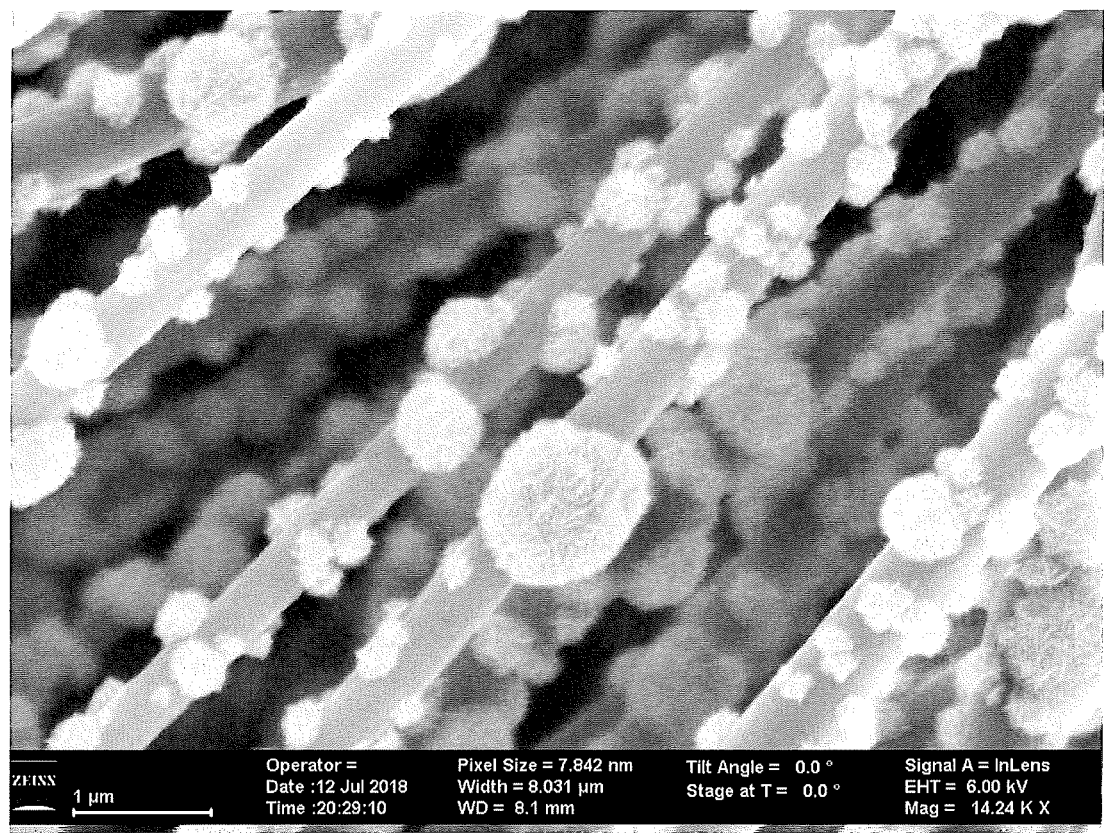
FIG. 23 is a SEM of the $Fe_2O_3$—$MnO_2$ coated ECNFs, according to some embodiments.

For the $Fe_2O_3$—$MnO_2$/ECNFs, all of the steps are the same as $Fe_2O_3$ electrodeposition in Example 4, except an aqueous precursor solution containing 50 mM $FeSO_4$ and 50 mM $MnSO_4$ (ACROS Organics) was used as the supporting electrolyte. FIG. 23 is a SEM of the $Fe_2O_3$—$MnO_2$ coated ECNFs.

Figure 24A:
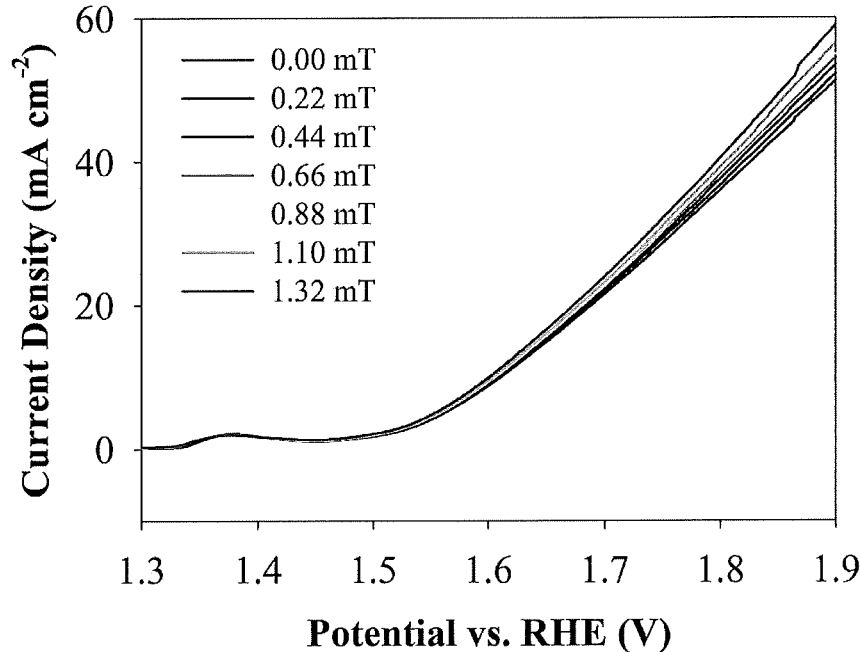
FIG. 24a illustrates OER current densities for the $Fe_2O_3$—$MnO_2$ coated ECNFs under application of magnetic fields of varying strength, according to some embodiments.
Figure 24B:
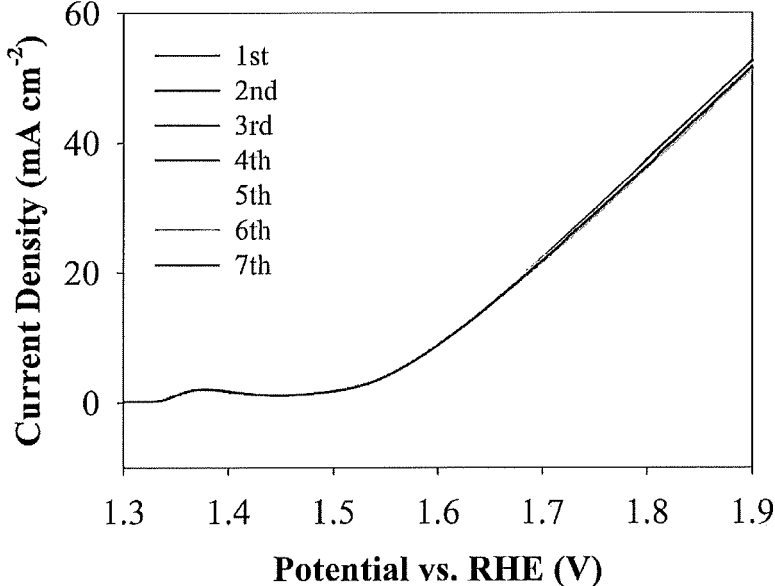
FIG. 24b illustrates OER current densities for the $Fe_2O_3$—$MnO_2$ coated ECNFs in the absence of magnetic field application, according to some embodiments.
Figure 24C:
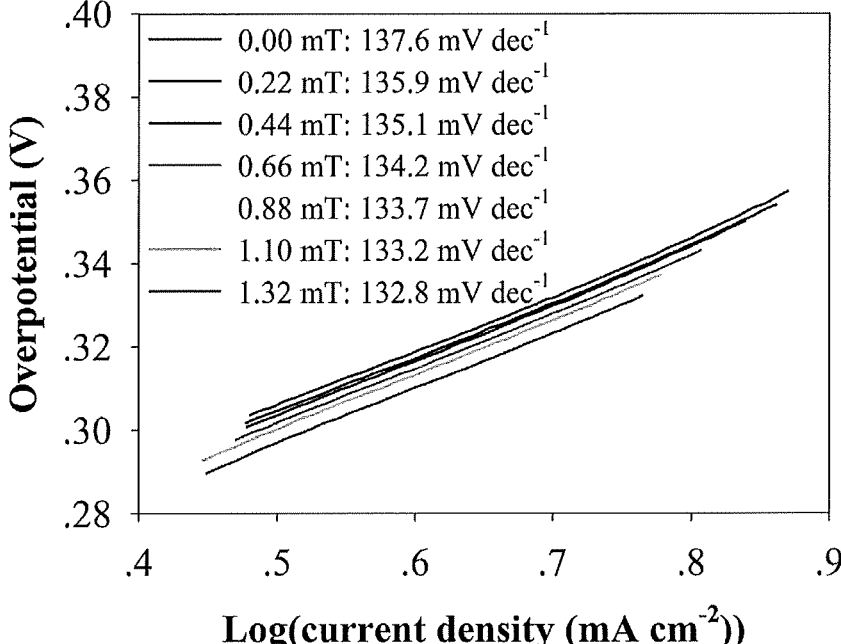
FIG. 24c is a Tafel plot illustrating increased OER efficiencies of the $Fe_2O_3$—$MnO_2$ coated ECNFs with increasing magnetic field strength, according to some embodiments.

The $Fe_2O_3$—$MnO_2$ coated ECNFs were tested for OER activity. FIG. 24a illustrates OER current densities for the $Fe_2O_3$—$MnO_2$ coated ECNFs under application of magnetic fields of varying strength. FIG. 24b illustrates OER current densities for the $Fe_2O_3$—$MnO_2$ coated ECNFs in the absence of magnetic field application. Substantial increases in current densities were observed for the $Fe_2O_3$—$MnO_2$ coating ECNFs relative to the $MnO_2$ coated ECNFs of FIGS. 21a and 21b and the $Fe_2O_3$ coated ECNFs of FIGS. 22a and 22b. FIG. 24c is a Tafel plot illustrating increased OER efficiencies of the $Fe_2O_3$—$MnO_2$ coated ECNFs with increasing magnetic field strength.

Various embodiments of the invention have been described in fulfillment of the various objectives of the invention. It should be recognized that these embodiments are merely illustrative of the principles of the invention. Numerous modifications and adaptations thereof will be readily apparent to those skilled in the art without departing from the spirit and scope of the invention.

The invention claimed is:

1. A method of enhancing the efficiency of an oxygen evolution reaction (OER), an oxygen reduction reaction (ORR), or a hydrogen evolution reaction (HER) comprising:
    increasing a total number electron pathway of the OER, ORR, or HER by conducting the OER, ORR, or HER in an applied magnetic field having a magnitude of 0.1 to 1000 mT, wherein
    an electrode participating in the OER, ORR, or HER is coated with one or more metal oxides selected from the following: $Co_3O_4$, $MnO_2$, NiOx, $TiO_2$ or a combination of $Fe_2O_3$ and $MnO_2$, the electrode comprising an electrode scaffold comprising one or more carbon nanostructures, wherein the carbon nanostructures are aligned electrospun carbon nanofibers (ECNFs).

2. The method of claim 1, wherein the method is a method of enhancing the efficiency of an ORR that comprises increasing a total number electron pathway of the ORR by conducting the ORR in an applied magnetic field having a magnitude of 0.1 to 1000 mT, and the total number electron pathway of the ORR is at least 3.4.

3. The method of claim 2, wherein the total number electron pathway of the ORR is 3.6 to 4.

4. The method of claim 2, wherein the total number electron pathway of the ORR is 3.85 to 4.

5. The method of claim 1, wherein the electrode participating in the OER, ORR, or HER is coated with $Co_3O_4$.

6. The method of claim 1, wherein the coating has structure to confine reaction products created at the electrode.

7. The method of claim 6, wherein one or more of the reaction products undergo oxidation or reduction by the electrode.

8. The method of claim 1, wherein the one or more metal oxides comprises one or more dopants.

9. The method of claim 8, wherein the one or more dopants are selected from the group consisting of alkali metals, alkaline earth metals and mixtures thereof.

10. The method of claim 1, wherein the electrode participating in the OER, ORR, or HER is coated with $MnO_2$.

11. The method of claim 1, wherein the electrode participating in the OER, ORR, or HER is coated with NiOx.

12. The method of claim 1, wherein the electrode participating in the OER, ORR, or HER is coated with $TiO_2$.

13. The method of claim 1, wherein the electrode participating in the OER, ORR, or HER is coated with a combination of $Fe_2O_3$ and $MnO_2$.

14. The method of claim 1, wherein the electrode participating in the OER, ORR, or HER is coated with $MnO_2$.

15. The method of claim 1, wherein the electrode participating in the OER, ORR, or HER is coated with NiOx.

16. The method of claim 1, wherein the electrode participating in the OER, ORR, or HER is coated with $TiO_2$.

17. The method of claim 1, wherein the electrode participating in the OER, ORR, or HER is coated with a combination of $Fe_2O_3$ and $MnO_2$.

\* \* \* \* \*